(12) United States Patent
Singh et al.

(10) Patent No.: US 11,676,473 B2
(45) Date of Patent: *Jun. 13, 2023

(54) RAPID THERMAL DYNAMIC IMAGE CAPTURE DEVICES

(71) Applicant: TEMPERATURE GATE IP HOLDINGS LLC, Irvine, CA (US)

(72) Inventors: Ravindra Pratap Singh, Irvine, CA (US); Daniel Maurice Lerner, Missouri City, TX (US)

(73) Assignee: TEMPERATURE GATE IP HOLDINGS LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/132,711

(22) Filed: Dec. 23, 2020

(65) Prior Publication Data

US 2022/0189280 A1 Jun. 16, 2022

Related U.S. Application Data

(63) Continuation of application No. 16/994,174, filed on Aug. 14, 2020, now Pat. No. 10,909,835.

(51) Int. Cl.
*G08B 21/18* (2006.01)
*G01J 5/00* (2022.01)
(Continued)

(52) U.S. Cl.
CPC .......... *G08B 21/182* (2013.01); *G01J 5/0025* (2013.01); *G01J 5/0806* (2013.01);
(Continued)

(58) Field of Classification Search
CPC .... G08B 21/182; G01J 5/0025; G01J 5/0806; G01J 5/10; G01J 2005/0077; G01J 2005/106; G01J 2005/0048; G01S 5/16
See application file for complete search history.

(56) References Cited

U.S. PATENT DOCUMENTS 4,387,724 A 6/1983 Zartmen
4,797,840 A 1/1989 Fraden
(Continued)

FOREIGN PATENT DOCUMENTS

CA 2365863 A1 9/2000
CN 102147835 A 8/2011
(Continued)

*Primary Examiner* — David P Porta
*Assistant Examiner* — Meenakshi S Sahu
(74) *Attorney, Agent, or Firm* — ePatentManager.com; Guerry L. Grune

(57) ABSTRACT

One or more temperature measuring devices are described that comprise; thermal imaging cameras capable of detection and provision of an exact location of at least one created dynamic image scanned by and triangulated with at least two thermal imaging cameras, and a gate that provides a constrained targeted pathway through which at least one person must travel so that dynamic thermal data of the person is captured as the person is moving through the gate and wherein thermal imaging cameras are geometrically arranged in positions such that the thermal imaging cameras field of view exist on or within the gate and wherein the person is scanned and provides targeted dynamic thermal data that is converted into one or more temperature readings that measure and transmit the temperature readings from one or more photodetectors that sense thermal radiation naturally emitted by people passing through.

30 Claims, 9 Drawing Sheets

(51) Int. Cl.
   *G01S 5/16* (2006.01)
   *G01J 5/10* (2006.01)
   *G01J 5/0806* (2022.01)
   *G01J 5/80* (2022.01)
(52) U.S. Cl.
   CPC .................................. *G01J 5/10* (2013.01);
     *G01S 5/16* (2013.01); *G01J 5/80* (2022.01);
     *G01J 2005/0077* (2013.01); *G01J 2005/106*
     (2013.01)

(56) References Cited

U.S. PATENT DOCUMENTS

| | | | |
|---|---|---|---|
| 6,629,776 | B2 | 10/2003 | Bell et al. |
| 8,317,720 | B2 | 11/2012 | Laurence et al. |
| 8,494,482 | B2 | 7/2013 | Gupta |
| 8,663,106 | B2 | 3/2014 | Stivoric et al. |
| 8,834,020 | B2 | 9/2014 | Abreu |
| 9,204,806 | B2 | 12/2015 | Stivoric et al. |
| 9,470,584 | B2 | 10/2016 | Pompei et al. |
| 9,504,389 | B2 | 11/2016 | Augustine |
| 10,909,835 | B1* | 2/2021 | Singh .................... G01J 5/0806 |
| 2004/0242976 | A1* | 12/2004 | Abreu .................... A61B 5/746 600/315 |
| 2007/0295713 | A1 | 12/2007 | Carlton-Foss |
| 2008/0154138 | A1* | 6/2008 | McQuilkin ........... G01J 5/0025 600/549 |
| 2009/0105605 | A1* | 4/2009 | Abreu ................. A61B 5/1176 600/549 |
| 2010/0250985 | A1 | 9/2010 | Gupta |
| 2017/0065183 | A1 | 3/2017 | Abreu |

FOREIGN PATENT DOCUMENTS

| | | |
|---|---|---|
| CN | 101257513 B | 11/2012 |
| CN | 106108862 A | 11/2016 |
| CN | 105962906 B | 5/2019 |
| EP | 3156774 A1 | 4/2017 |
| WO | 2004/110248 A2 | 12/2004 |
| WO | 2015/054681 A1 | 4/2015 |
| WO | 2017/064158 A1 | 4/2017 |

\* cited by examiner

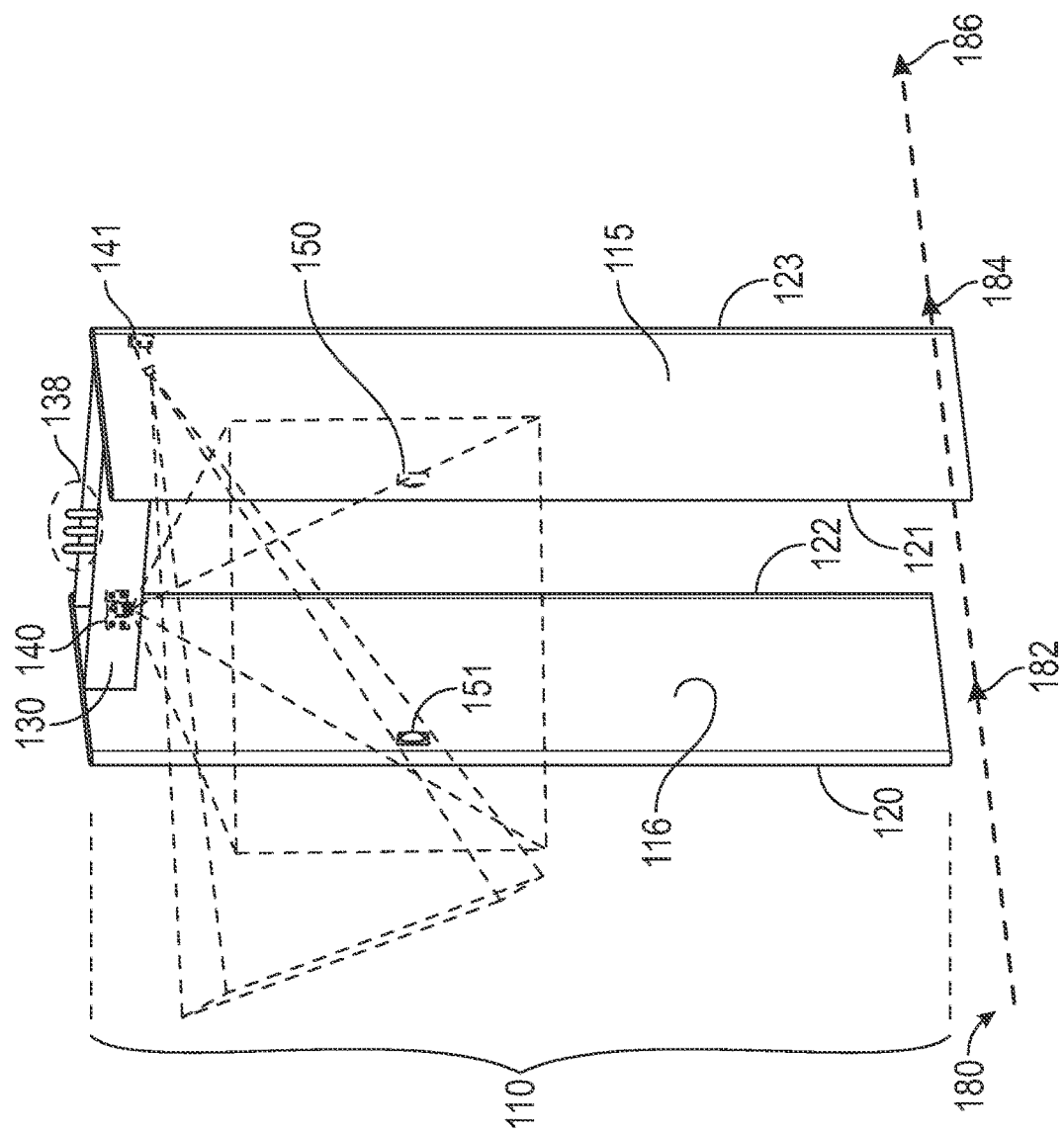
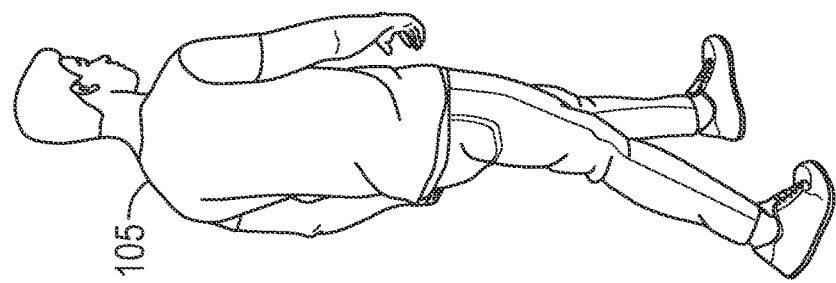
FIG. 1A

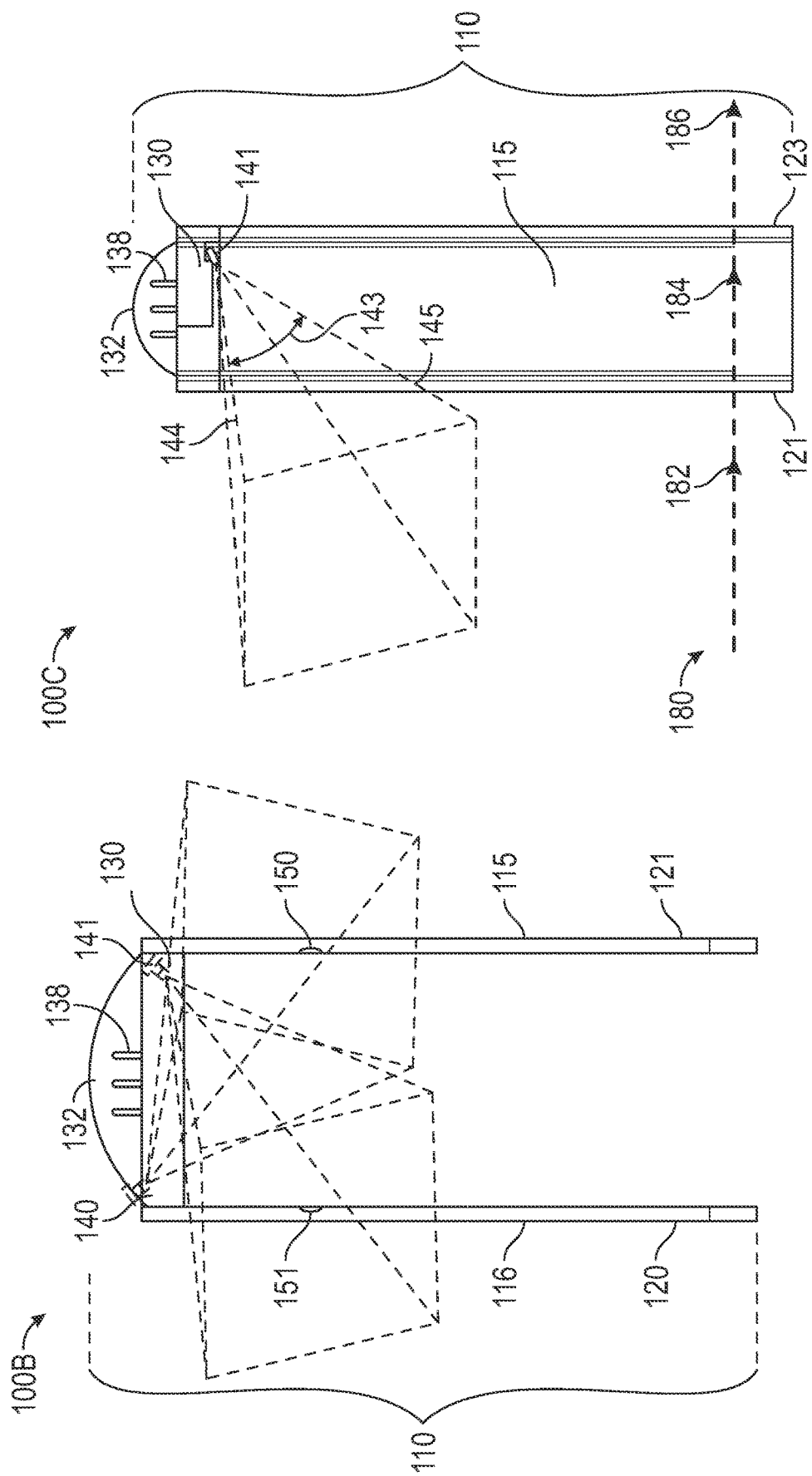

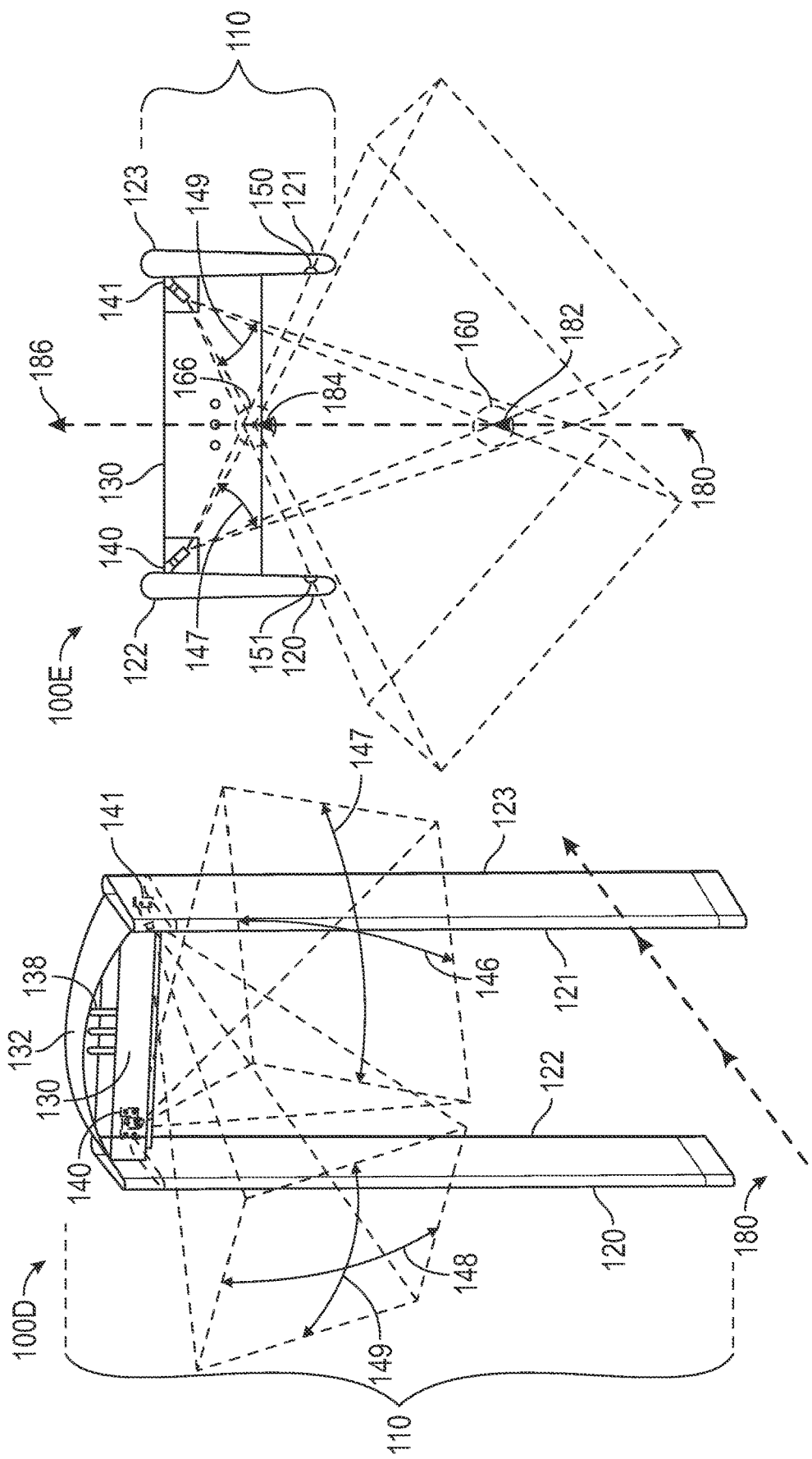

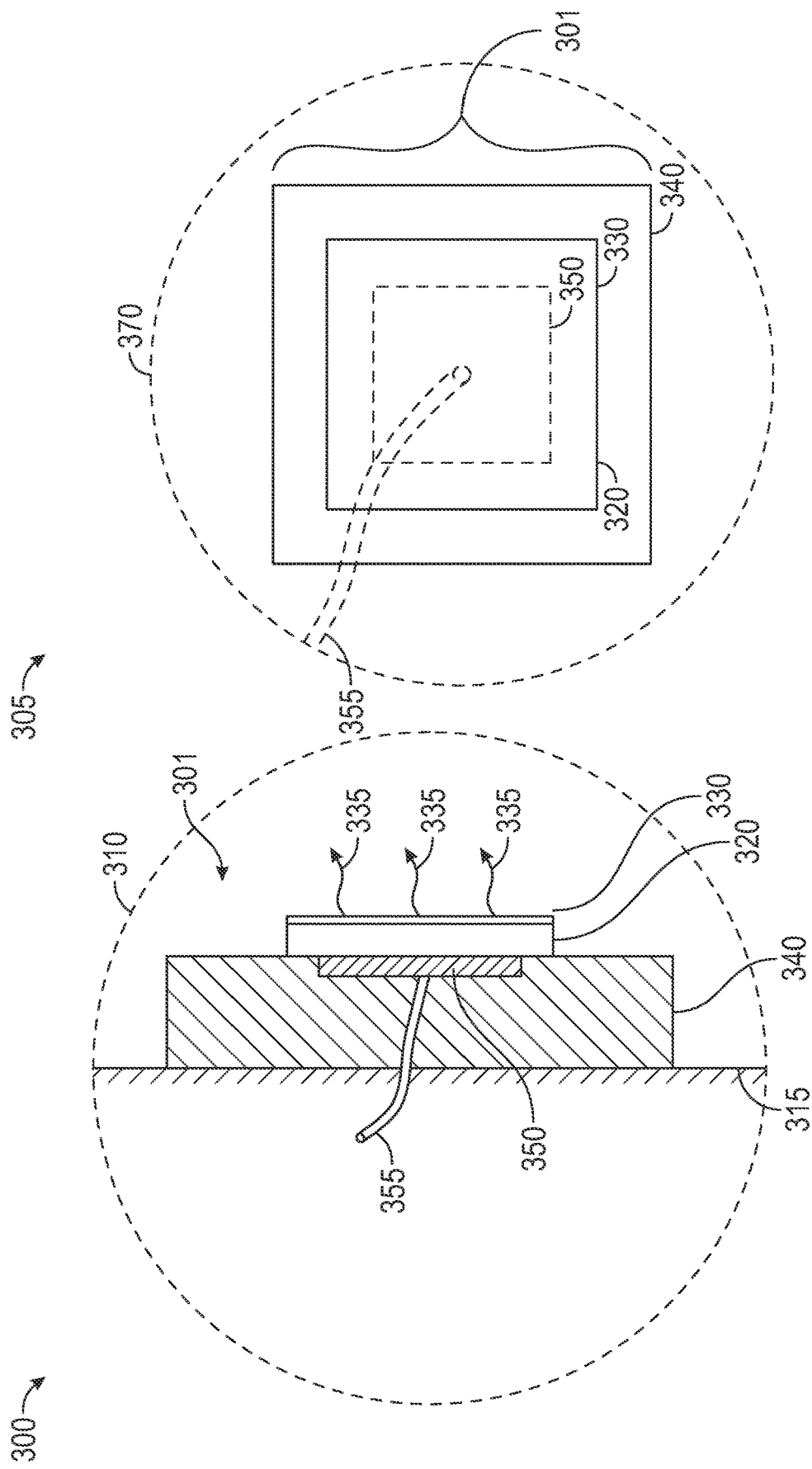

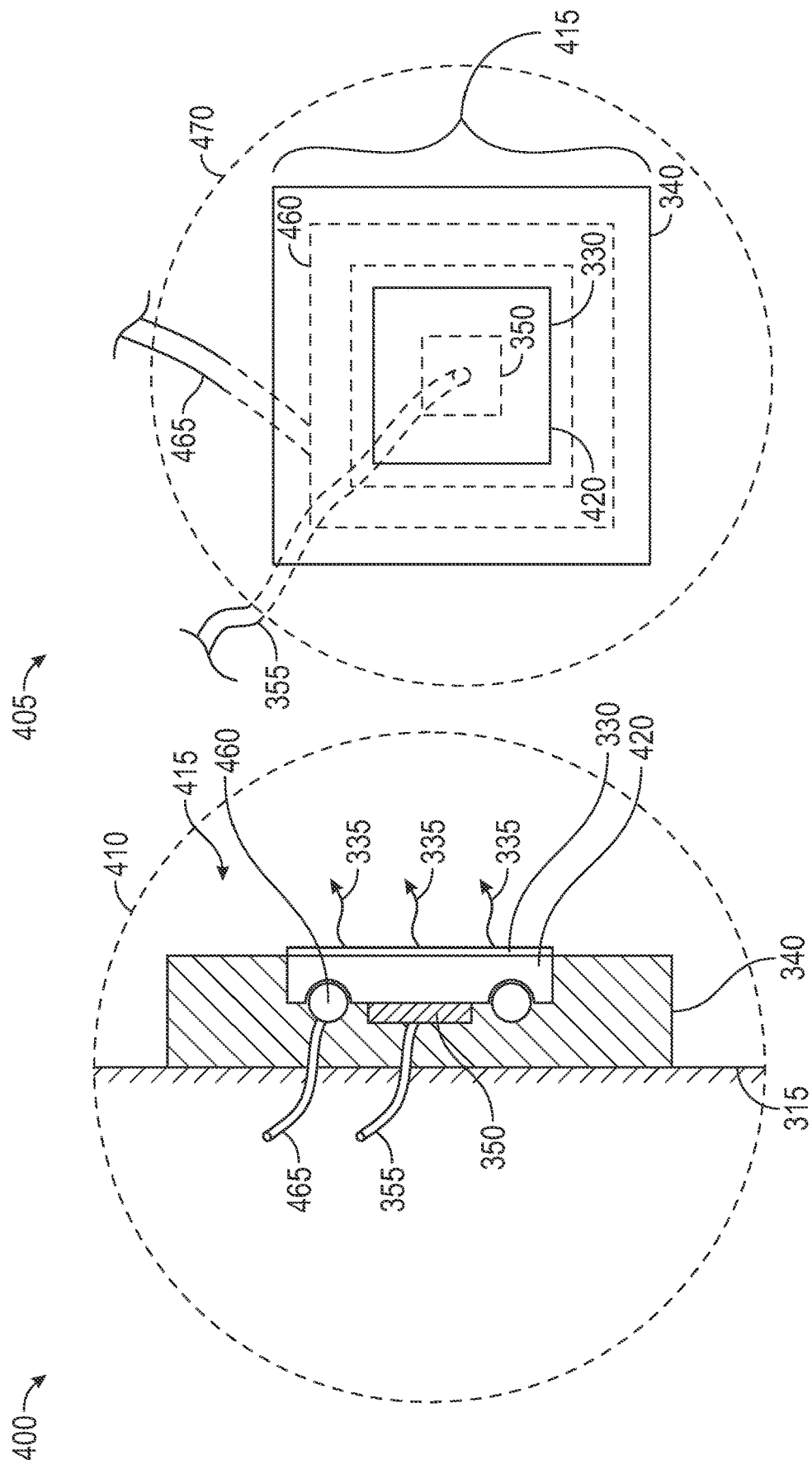

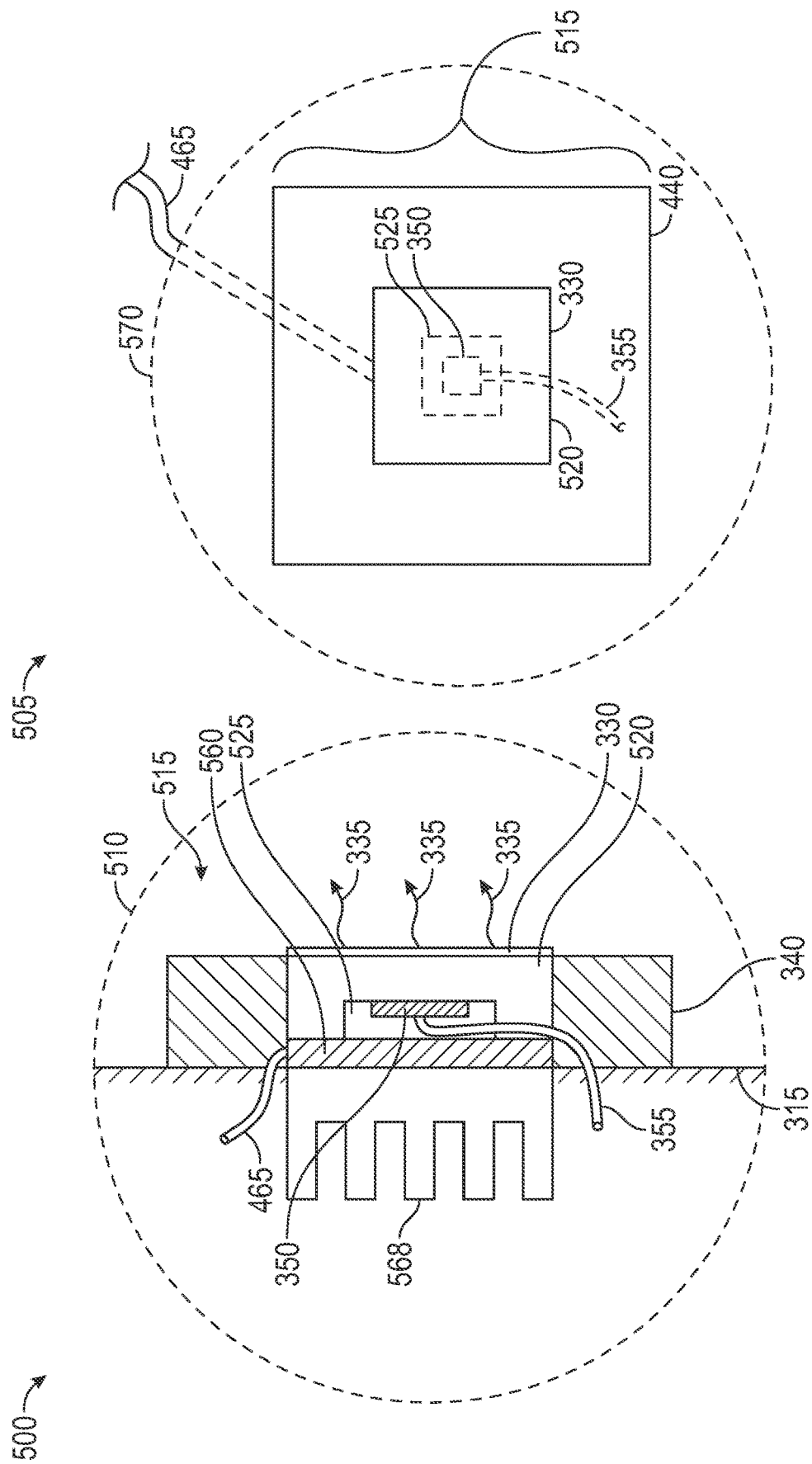

RAPID THERMAL DYNAMIC IMAGE CAPTURE DEVICES

PRIORITY

This application is a continuation of and claims priority under 35 USC 120 of U.S. patent application Ser. No. 16/994,174, filed Aug. 14, 2020 and entitled "Rapid Thermal Dynamic Image Capture Devices".

DESCRIPTION

With the onset of a global pandemic involving COVID-19, a strain of severe acute respiratory syndrome coronavirus, specifically SARS-CoV-2, it has become increasing useful and often necessary to determine the likelihood that an individual is infected. One technique is to determine with a high degree of accuracy and precision the temperature of individuals so that entrance to an area and the area itself that is populated with supposedly non-infected individuals can be protected.

FIELD OF DISCLOSURE

The present disclosure includes devices and associated techniques required to provide essentially instantaneous thermal imaging sensing and measurement data in order to manage any abnormalities indicated by such measurements. Due to the current pandemic outbreak associated with COVID-19, the ability to make these measurements on humans that are moving through buildings or into crowded areas has become an urgent need. Disruption of human movement with handheld wireless devices to measure forehead temperature, for instance, will not enable larger populations of people to enter, exit, or exist within confined areas within the time frame necessary to conduct business, attend an event, or be transported from one location to another by any form of public transportation without severe delays. The present disclosure addresses these issues so that dynamic thermal measurements (measurements made while people/animals/objects are moving) of humans on the move can be accomplished without severe delays. These delays already are crippling and/or cancelling out the ability for humans to move freely while simultaneously increasing risk of contamination and overall public health concerns. The present disclosure addresses devices and techniques designed to reduce and in some cases eliminate these risks.

BACKGROUND

The use of thermal sensing and imaging equipment to measure temperature surfaces of objects animals and humans has been developed over at least the last 50 years. The ability to measure these temperatures for humans is well known and understood using thermal imaging equipment such as infrared cameras that are able to deliver both accurate and precise readings for stationary objects—including humans. Using high resolution cameras which are expensive and difficult to mount and deploy due to costs, potential theft, and the number required for populated locations where numerous readings must be accomplished in very short time intervals due to human movement, is essentially impossible. The need exists to create a relatively inexpensive, low resolution image capturing device or set of devices that are coordinated to provide accurate and precise thermal imaging that collect the data and provides at least a semi-instantaneous result that is interpreted as a "go"/"no go" option within a short time interval for individuals (and/or objects) that are on the move. The devices must be capable of capturing the thermal imaging data and reporting the results within a time frame of less than 0.5 seconds (500 ms) for at least one individual and preferably for more than one individual as they pass through these devices or sets of devices. The goal is to keep the flow of traffic of the population of humans (or other animals/objects) continuous and heading toward their public office, retail, restaurant and other popular local buildings or while trying to attend concerts and sporting events, as well as airports, subways, buses, and railway stations. Making these thermal measurements in a dynamic manner is necessary to overcome unwanted delays that have already stymied human activity and disrupted or destroyed entire economies. Due to the recent COVID-19 pandemic, the need to develop devices and techniques that accomplish these tasks in an efficient and cost-effective manner has become urgent. It is clear that if this need can be met, the number of devices accomplishing these techniques will be great and ever increasing as all populations try to protect their citizens as well as those entering and leaving their respective territories and countries.

Interfering constituents and variables can introduce significant source of errors that prevent measured biologic parameters from being of clinical value. In order to bypass these interfering constituents and achieve undisturbed signals, invasive and semi-invasive techniques have been used. Such techniques have many drawbacks including difficulties in providing continuous monitoring for long periods of time. Non-invasive techniques also failed to deliver the clinical usefulness needed. The placement of a sensor on the measured and core characterized by the presence of interfering constituents does not allow obtaining clinically useful nor accurate signals due to the presence of these interfering constituents and background noise which greatly exceeds the signal related to the physiologic parameter being measured.

The most precise, accurate, and clinically useful way of evaluating thermal status of the body in humans and animals is by measuring brain temperature. Brain temperature measurement is the key and universal indicator of both disease and health equally, and is the only vital sign that cannot be artificially changed by emotional states. The other vital signs (heart rate, blood pressure, and respiratory rate) all can be influenced and artificially changed by emotional states or voluntary effort. In the absence of being able to measure brain temperature, measured and core temperature of the head region is the next best alternative.

Body temperature is determined by the temperature of blood, which emits heat as far-infrared radiation. Adipose tissue (fat tissue) absorbs far-infrared and the body is virtually completely protected with a layer of adipose tissue adherent to the skin.

Because it appeared to be impossible with current technology to non-invasively measure brain temperature, attempts were made to determine internal body temperature, also referred to as "core temperature". An invasive, artificial, inconvenient, and costly process is currently used to measure internal (core) temperature consisting of inserting a catheter with a temperature sensor in the urinary canal, rectum or esophagus. Such methodology is not suitable for routine measurement, as it is painful, has potential fatal complications and of course cannot be used for humans, animals, or other objects on the move. In other words, this would not provide a reliable dynamic temperature reading.

Semi-invasive techniques have also being tried. Abreu disclosed in U.S. Pat. No. 6,120,460 apparatus and methods for measuring core temperature continuously using a contact lens in the eyelid pocket, but the contact lens is a semi-invasive device which requires prescription by a physician and sometimes it is not easy to place the contact lens in the eye of an infant or even in adults and many people are afraid of touching their eyes.

There are several drawbacks and limitations in the related art for continuous and/or core measurement of temperature. Measurement of human temperature today is non-continuous, non-core and often nurse dependent. Nurses have to stick a thermometer in the patient's mouth, rectum or ear or use a handheld device to measure forehead temperature. To get core temperature nurses invasively place a tube inside the body which can cause infection and costly complications. As of this writing during the COVID-19 pandemic, handheld devices that scan the forehead temperature are also in vogue.

Measurement of core temperature on a routine basis in the hospital and/or continuously is very difficult and risky because it requires an invasive procedure with insertion of tubes inside the body or by ingesting a thermometer pill. The thermometer pill can cause diarrhea, measure temperature of the fluid/food ingested and not body temperature, and have fatal complications if the pill obstructs the pancreas or liver ducts. Placement of sensors on the skin do not provide clinically useful measurements because of the presence of many interfering constituents including fat tissue.

It is not possible to acquire precise and clinically useful measurements of not only brain temperature, but also metabolic parameters, physical parameters, chemical parameters, and the like by simply placing a sensor on the skin. One key element is the presence of fat tissue. Fat varies from person to person, fat varies with aging, fat content varies from time to time in the same person, fat attenuates a signal coming from a blood vessel, fat absorbs heat, and fat prevents delivery of undisturbed far-infrared radiation. In addition, fat increases the distance traveled by the element being measured inside the body and an external sensor placed on the surface of the skin.

Also known in the art is the use of a brain tunnel scanner (BTT) that detects brain temperature and provides image correspondence to the BTT area or an image that includes the BTT area. This BTT ThermoScan converts thermal radiation into a video image that can be displayed on a screen.

The BTT ThermoScan also includes monitoring mass screening of children and people at risk during flu season. With the shortage of nurses an automated screening can greatly enhance the delivery of health care to the ones in need. When a student walking by the infrared camera is identified as having a temperature disturbance (e.g., fever) a conventional digital camera is activated and takes a picture of the student. The picture can be emailed to the school nurse that can identify the student in need of care or automatically by using stored digital pictures.

An exemplary lens system for viewing thermal radiation coming from the BTT can include exemplarily 25 sensors for reading at 1 inch from the tip of the sensor to the measured and core at the BTT entrance and 100 sensor array for reading radiation coming from a distance of 3 inches between measured and core at the BTT and sensor tip. Preferably a five degree field of view, and most preferably a two to three degree field of view, and yet even a one degree of field view is used to see the main entry point of the BTT. The spot size (view area) of the infrared sensor is preferably between 1 and 20 mm in diameter and most preferably between 3 and 15 mm in diameter which allows the infrared sensor to receive radiation from the BTT entrance area when the sensor is aimed at the BTT entrance area which corresponds to the bright spots in FIG. 1A and the red-yellow area in FIG. 1B. It is understood that an infrared device (thermopile) can be placed at any distance and read the temperature of the BTT entrance area, as long as the sensor is positioned in a manner to view the BTT entrance area and a lens is used focus the radiation on to the temperature sensor.

One particular application of the present disclosure consists of prevention of a terrorist attack by a terrorist getting infected with a disease (e.g., SARS—Severe Acute Respiratory Syndrome) and deceiving thermometers to avert detection of fever when entering the country target for the terrorist attack.

As has been recently shown SARS could potentially become a high terrorist threat because it cannot be destroyed. By being naturally created, SARS could become a weapon of mass destruction that cannot be eliminated despite use of military force or diplomatic means. A terrorist can get the infection with the purpose of spreading the infection in the target country. With current technology any device can be deceived and current devices would measure normal temperature when indeed fever is present. Simple means can be used by a terrorist, such as washing their face with cold water or ice or by immersion in cold water, to manipulate any known device for measuring fever including current infrared imaging systems and thermometers. The thermal physiology of the body can be manipulated and the measurement performed can give a false negative for fever.

A terrorist with SARS could easily spread the disease by many ways including individually by shaking hands with clerks on a daily basis on a mass scale by spending time in confined environments such as movie theater, a concert, grocery store, a government building, and others, or by contaminating water or drinking fountains. All of those people infected do not know they caught the disease and start to spread SARS to family members, co-workers, friends and others, who subsequently will infect others, leading to an epidemic situation.

From a medical standpoint, intentional spread of SARS can have immeasurable devastating effects. People not knowing they have the disease may go to a hospital for routine checks or people not feeling good may go to a hospital for routine checks. Patients and others coming to the hospital can then acquire the disease. Admitted patients, who are debilitated, can easily acquire SARS. Spread of SARS in a hospital environment can be devastating and the hospital may need to shut down. Therefore, one person with SARS can lead to the shut-down of a whole hospital. Considering that people infected with the disease may go to different hospitals, several hospitals could get contaminated and would have to be partially or completely shut down. This could choke the health care system of a whole area, and patients would have to be transported to other hospitals. Those patients may have acquired SARS as well as perpetuating the transmission cycle. If this is done in several areas by a concerted terrorist effort, much of the health care system of a country could be choked, besides countless doctors and nurses could become infected with SARS which would further cripple the health care system by shortage of personnel.

There remains a need to identify one or more devices and associated techniques that can non-invasively, conveniently, and continuously monitor primarily brain temperature as well as temperature of the measured and core in the head region in a painless, simple, external, inexpensive, and safe manner without placing sensors directly on the skin.

There is also a need to identify one or more devices and associated techniques capable of measuring temperature and potentially other biological parameters by positioning thermal sensors/cameras for the acquisition of undisturbed and continuous thermal/biological signals.

SUMMARY OF THE INVENTION

The present invention provides one or more devices and associated techniques, methods, apparatus and systems that effectively address the needs described above.

More specifically, the present disclosure describes one or more temperature measuring devices comprising;

at least two thermal imaging cameras capable of detection and provision of an exact location of at least one created dynamic image scanned by and triangulated with the at least two thermal imaging cameras, wherein the at least two thermal imaging cameras include a lens, an optical system, and a photodetector, one or more computerized microprocessors, and a gate that provides a constrained targeted pathway through which at least one person must travel so that dynamic thermal data of the at least one person is captured as the at least one person is moving through the gate, wherein the thermal imaging cameras are geometrically arranged in positions such that the thermal imaging cameras field of view on at least one of two possible locations that exist on or within said gate wherein the at least one person is scanned and provides targeted dynamic thermal data that is converted into one or more temperature readings and wherein the temperature measuring devices measure and transmit the temperature readings from one or more photodetectors existing within the thermal imaging cameras that sense thermal radiation naturally emitted by people passing through and defined by both the constrained targeted pathway detected by the thermal imaging cameras such that the at least two thermal imaging cameras lenses are focused on discrete points of a specific area defined by a focal view provided by the at least two thermal imaging cameras that combined provide a focused three dimensional volume along the constrained targeted pathway through which the at least one person passes through so that intersecting dynamic images are captured by the at least two thermal imaging cameras of the at least one person's at least one digital data image within the focused three dimensional volume that is converted to at least one digital data image by one or more computerized microprocessors that provides rapid detection, organization, extraction, and conversion of the digital data image(s) to both measured and core temperature values and one or more exact dynamic locations of each person that passes through the gate, wherein the photodetector quantifies an energy flux in a measured long-infrared range of energy naturally emitted from the at least one person that moves through the targeted pathway as viewed by a set of optics provided with the thermal imaging cameras.

Temperature measuring devices are provided, wherein the measured and core temperature values and dynamic location measurements are extracted only after the at least one digital data image has been verified, correlated, and confirmed with a computational capability provided by the at least one computerized microprocessor to exist as a measured and core temperature taken from above a person's shoulders and within a temperature range of between 90 and 110 degrees Fahrenheit as provided by the computational capability.

Temperature measuring devices are described, wherein the gate is a physical gate comprising at least two panels and a connecting top portion, wherein the connecting top portion is attached to a top portion of the at least two panels.

Temperature measuring devices are described, wherein the gate is a virtual gate in that the gate constrains the constrained targeted pathway of the at least person as they are scanned by the temperature measuring devices.

Temperature measuring devices are provided, wherein the at least one created dynamic image is captured by three or more cameras that includes two or more thermal imaging cameras and at least one video imaging camera or at least one charge coupled (CCDP) camera.

Temperature measuring devices are enabled, wherein the at least one video imaging camera provides an initial target locator along the constrained targeted pathway for the at least one person entering and exiting the temperature measuring devices to provide at least one dynamic location of at least one dynamic image of a bare portion of a human face as the at least one person passes through the gate.

Temperature measuring devices are described, wherein the photodetector is a radiation sensor and/or a radiation detector or a long wavelength infrared (LWIR) sensor array.

Temperature measuring devices are provided, wherein the temperature measuring devices capture an instantaneous image of a measured temperature that is taken from an actual size of a person's body that is located above a shoulder region to at least a hairline region that is a resolved dynamic image of an actual size of a portion of a person's body is at least ½ inch by ½ inch.

Temperature measuring devices are described, wherein the at least two thermal imaging cameras are low resolution cameras with the lens capable of location and resolution of dynamic images and provision of dynamic temperature readings with at least 64×64 pixels.

Temperature measuring devices are presented, wherein the at least two thermal imaging cameras provide an apparent pixel size at a distance wherein apparent pixels are smaller than or equal to ½ inch×½ inch, wherein the apparent pixel size is determined by pixel resolution of the two or more thermal imaging cameras, a field of view of the two or more thermal imaging camera lens and optics and a distance of the at least one person scanned by the two or more thermal imaging cameras.

Temperature measuring devices are disclosed, wherein an angle of view of the cameras is between 1 and 1000 mRad.

Provided herein are temperature measuring devices, wherein the at least two thermal imaging cameras have sensors capable of measuring a long wave infrared (LWIR) range of 8 to 15 μm.

Described herein are temperature measuring devices, wherein the measured and core temperature values and dynamic location measurements are provided as an audio, visual, and/or audio-visual display.

Temperature measuring devices are provided, wherein the measured and core temperature values are provided as readouts in a form of data that is captured and subsequently selected from one or more of a group of data acquisition capabilities including; transmission, storage, analysis, retrieval and display via written, audible, visual and/or audible-visual techniques.

Temperature measuring devices are described, wherein a display unit displays a thermal image of the focused three-dimensional volume as viewed by lens(es) of the cameras as the at least one person passes through the gate.

Presented herein are temperature measuring devices, wherein at least one display unit is included that is an alarm notification device that provides a go/no go signal and wherein a red light is one such signal and wherein said temperature measuring devices also include an alarm notification capability when a temperature reading is outside a specific temperature range and wherein the specified temperature range is between 90 and 110 degrees Fahrenheit.

Temperature measuring devices are provided, wherein the devices provide at least four measured and core temperature measurements within a set time interval.

Temperature measuring devices are presented, wherein dynamic images and associated temperature readings are rapid in that said temperature reading is performed within a time interval of no greater than 500 ms.

Temperature measuring devices are described, wherein the at least two thermal imaging cameras have been pre-calibrated with one or more black bodies so that temperature readings are accurate, precise and reproducible with a range of between 2 and 4 degrees Fahrenheit.

Temperature measuring devices are disclosed, wherein an apparent field of view (FOV) exists as a cross-sectional area that defines a size, a shape, and distance scanned by and away from the at least two thermal imaging cameras and requires an alignment of one or more calibrators that are viewed by pixels of images from the one or more thermal imaging cameras that provides at least one reference temperature.

Temperature measuring devices are provided, wherein at least one known IR reference temperature calibrator provides a reference data point to make an absolute comparison for thermal imaging camera temperature calibration.

At least one calibrator is described, wherein the calibrator provides the thermal imaging cameras a temperature measurement capable of linear interpolation that provides an ability to accurately detect and quantify temperatures that are close to a known reference point and allows for an at least three point calibration and provides temperature measurements above and below a known calibrator temperature known as an OFFSET for camera measurement of thermal flux.

At least one calibrator is described, wherein the at least one calibrator includes utilization of a Peltier cell with multiple reference temperatures that provide reference ne temperature measurements and readings at discrete temperature intervals that provides an increased capability of precision temperature measurement.

Thermal imaging devices are provided wherein the gate is mounted in an airport, library, museum, indoor or outdoor sports arenas, courthouse, restaurant, or other public or private venues.

The thermal imaging devices are provided wherein the temperature measuring devices are mounted in a public space to scan multiple individuals passing by.

One or more temperature measuring devices are provided comprising two or more thermal imaging cameras that provide digital images processed using a first set of rules with digital image measurement steps that include:

data detection which is a rule-based algorithm for locating both measurement target locations and target measured temperatures; and data organization that utilizes a rule-based algorithm for tracking a target in a 3D space over time to produce a 4D targeted path that tracks each target and;

temperature measurement data is provided as signals on a communication path to a process section that processes temperature measurement data measures and implements a second set of rules that must be employed to extract a set of data that uses digital image processing steps:

wherein first temperature measurement data is extracted using a second set of rules based algorithm that determines measured temperature of each target and an exact location that indicates where each temperature measurement was measured and wherein an additional second set of rules provides an algorithm for conversion of a target measured temperature to a core temperature of at least one person that passes through a targeted pathway of the temperature measuring devices.

One or more temperature measuring devices are described, wherein a process system provides an output which includes a list of core temperature measurement(s) at corresponding location(s).

One or more temperature measuring devices are provided, wherein a temperature measurement portion and a process data portion with a corresponding set of rules are made available to the one or more temperature measuring devices using an internal data channel, wherein the internal data channel communicates data between all internal processes and devices used to manufacture and implement the one or more temperature measuring devices.

One or more temperature measuring devices are described, wherein the temperature measurements are sent as data signals along a communication path to an action portion of one or more temperature measurements that utilizes another algorithm to determine specific actions necessary to ensure functionality of the one or more temperature measurement devices.

One or more temperature measuring devices are disclosed, wherein the temperature measurements provide core temperatures and corresponding locations from said process data portion according to a third set of rules that includes actions as follows;

(i) an annunciation capability based upon another rule based algorithm that is employed to provide core temperature measurements selected from at least one of a group consisting of; visual indicators, visual displays, bells, buzzers, alarms, audio speakers, audio content files and speech synthesizers, and;

(ii) an alarm capability that provides additional rule based algorithms to produce an alarm capability selected from at least one of a group consisting of via visual indicators, visual displays, bells, buzzers, alarms, audio speakers, audio content files, and speech synthesizers and;

(iii) an impedance capability that utilizes an algorithm that impedes a targeted pathway through said one or more temperature measuring devices that utilizes at least one of a group of devices selected from; locks, doors, gates, turnstiles and man traps.

One or more temperature measuring devices are provided, wherein upon completion of said action data that contains decisions are communicated via one or more communication paths back to a temperature measurement portion and requests additional measurements that provide more data eventually transmitted via said communication paths such that a continuously repeating cycle of temperature measurements is provided.

One or more temperature measuring devices are disclosed, wherein a local database continuously reads and writes data that provides data on demand to any portion of a process that subsequently provides data to reside in, or be extracted from said local database wherein said data is transmitted through said internal data channel.

In general, the present disclosure provides one or more devices with one or more set of sensing devices and systems and one or more recording and reporting capabilities which may be used individually or in combination, which are designed to respond to dynamic movement through a gate to measure thermal parameters. Based on an anatomical and physiological human or animal condition, the gate is placed along a targeted pathway through which the object to be measured must pass. The "temperature gate" or "Tempgate" comprises a direct and undisturbed connection between the source of the function (signal) within the body and an external point at the end of the gate located on the skin. This type of "physiological gate" detects and conveys continuous and integral data that is acquired from the physiology of the body. An undisturbed signal from the body is delivered to an external point which exists within a device that functions as both a gate and an entrance or exit along the targeted pathway through which the object (primarily and normally a human but could be an animal or other object) is passing. Two or more thermal imaging devices (such as digital thermal cameras) are placed in a specific geometric arrangement such that sensing the human's (primarily brain/head skin) temperature can be accomplished rapidly, accurately, precisely and with two or more relatively low resolution imaging devices. The positioning of the imaging devices are geometrically arranged to ensure optimal signal acquisition without interfering constituents and sources of error.

The present disclosure describes devices directed at measuring measured and core head and neck temperature of humans primarily above the shoulder region which may include brain temperature.

Measured temperature is the highest temperature that is measured with the current IR cameras and associated sensors which locate the head and neck area above the shoulders. The devices and associated systems of the present disclosure reject readings that are clearly out of a normal measured and core temperature bounds. The measured temperature is correlated with a core temperature, where the core temperature is a temperature that is determined using a clinical grade oral thermometer that is defined by use on a sample set of not less than 20 humans. In this manner, a correlation factor results that provides a calibration matrix/curve that is completed in order to more accurately provide a conversion value that correlates the measured temperature with the core temperature. An alarm system can be provided which utilizes the measured temperature value that can be set according to a predetermined temperature that corresponds with human fever temperature data. This data is also useful for patients who have tested positive for COVID-19 for example.

The "Tempgate" device of the present disclosure utilizes an ability to provide multiple viewpoints so that a lower number of false positives as well as improving the number and accuracy of automatic scanning rates is accomplished. Many useful applications can be achieved with the devices of the present disclosure including mass screening for fever, screening for hyperthermia in athletes at the end of a sports event (e.g., marathon), screening for hypothermia or hyperthermia for military personnel so as to select the one best fit physiologically for battle, and any other temperature disturbance in any condition in which the "Tempgate" devices can be installed.

The key to prevent the catastrophic effects of a terrorist attack is preparedness. The devices, apparatus and methods described in the present disclosure are helpful in providing rapid, dynamic detection of individuals whose skin temperature (above the shoulders) correlates with a temperature value that is greater than that of humans who are not infected. Placement of the "Tempgate" of the disclosure at the borders, seaports and airports of a country can prevent the artificial manipulation of the temperature measurement as well as possible terrorist attacks. The devices and systems of the present disclosure can help identify at all times and under any circumstances the presence of SARS and other diseases associated with fever.

In addition, mass screening of athletes could be performed with "Tempgate" installed at the finish line. An alert can be activated for any athlete who crosses the finish line with a high level of hyperthermia. Therefore, immediate care can be delivered allowing for the best clinical outcome since any delay in identifying hyperthermia could lead to heatstroke and even death.

Temperature disturbances such as hyperthermia and hypothermia can impair mental and physical function of any worker. Drivers and pilots in particular can have reduced performance and risk of accidents when affected by temperature disturbances. "Tempgate" can be mounted in the visor of a vehicle or plane to monitor body temperature with the cameras of "Tempgate" capturing a thermal image of the driver or pilot and providing an alert whenever a disturbance is noticed. It is understood that any thermal imaging system can be mounted in a vehicle or airplane to monitor body temperature and alert drivers and pilots, with the current disclosure focusing on providing temperature data for individuals on the move.

Hospitals, factories, homes, or any location that can benefit from automated mass or individual screening of temperature disturbances can use the "Tempgate" devices systems and associated thermal imaging apparatus in accordance with the present disclosure.

The present disclosure includes devices for collecting thermal radiation from the measured and core temperatures of one or more persons preferably from the head region above the shoulders and preferably even above the neck region. Positioning temperature measurement devices to receive thermal radiation from the person(s) is necessary e for converting thermal radiation into skin/head/core temperatures and more specifically into measured and core temperatures. The present disclosure also provides methods for determining skin/head/core vs measured temperature with methods including the steps of collecting the thermal emission from the person(s), producing a signal corresponding to the thermal emission collected, processing the signal and reporting the core and measured temperature. This disclosure also includes devices and methods for proper positioning of the temperature sensor(s) in a stable position along the "Tempgate" to make dynamic temperature readings as a person moves through the "Tempgate" device without stopping.

It is also an object of the present disclosure to provide devices, methods, and apparatus that allow monitoring fever and spikes of temperature.

The present disclosure also allows for transmission of the signal from the "Tempgate" device and supporting structures to watches, pagers, cell phones, computers, and the like.

These and other objects of the disclosure as well as many of the intended advantages thereof will become more readily apparent when reference is made to the following description taken in conjunction with the accompanying drawings.

BRIEF DESCRIPTION OF THE DRAWINGS

FIG. 1A is a schematic isometric view of one embodiment of a temperature measuring device with a person following a targeted pathway such that the person's temperature is scanned by the temperature measuring device.

FIG. 1B is a front view of the same embodiment of the same temperature measuring device.

FIG. 1C is a side view of the same embodiment of the same temperature measuring device.

FIG. 1D is an additional isometric view of the of the same embodiment of the same temperature measuring device with additional features not shown in FIG. 1A, FIG. 1E is a top view of the same embodiment of the same temperature measuring device.

FIG. 3A, is a cross sectional view of a passive thermal calibrator along with the cross section (310) shown.

FIG. 3B, is a frontal view of a passive thermal calibrator.

FIG. 4A provides a cross sectional view of the heated thermal calibrator.

FIG. 4B provides the frontal view of the heated thermal calibrator.

FIG. 5A provides a cross sectional view of the Peltier cell thermal calibrator.

FIG. 5B provides a frontal view of the Peltier cell thermal calibrator.

DETAILED DESCRIPTION

Figure 1F:
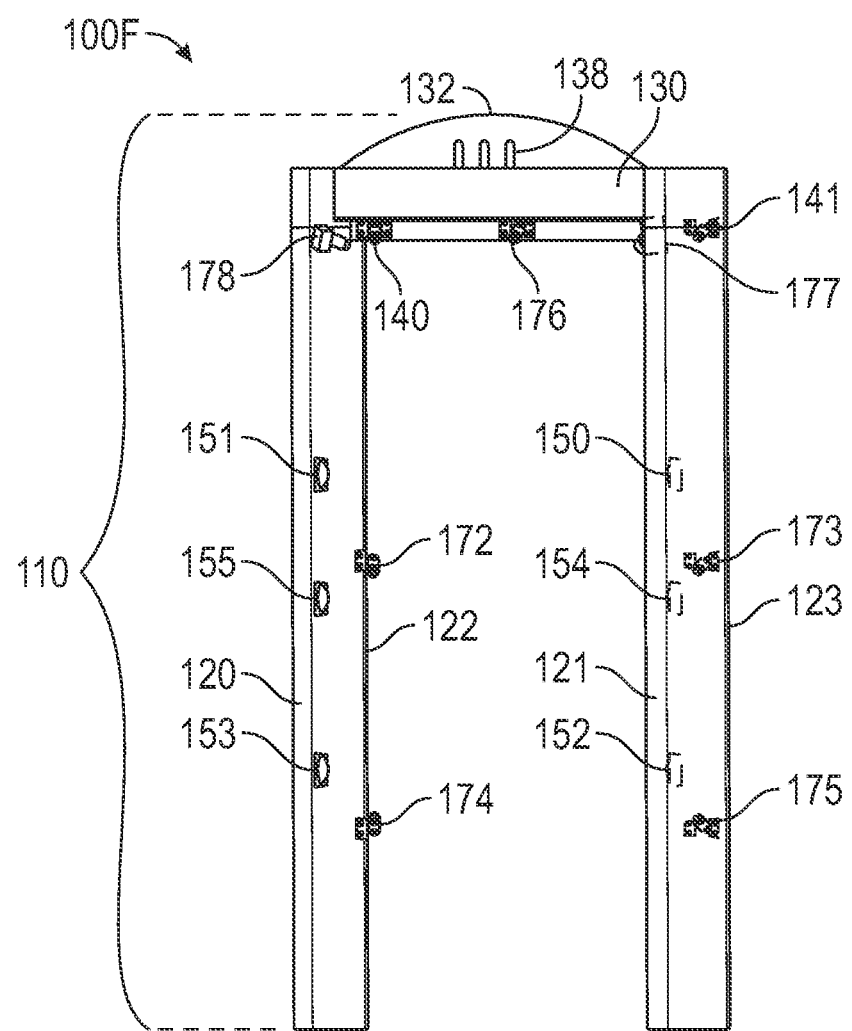
FIG. 1F is another front view of the same embodiment of the same temperature measuring device with additional features not shown in FIG. 1B.

In describing embodiments of the disclosure illustrated in the drawings, specific terminology will be resorted to for the sake of clarity. However, the disclosure is not intended to be limited to the specific terms so selected, and it is to be understood that each specific term includes all technical equivalents which operate in a similar manner to accomplish a similar purpose.

The present disclosure provides working examples described herein that were developed in order to detect and provide a person's or object's body temperature within 500 ms for a person or persons that are moving at approximately three (3) miles per hour (mph) which is a known standard for the rate at which most people walk. In order to accomplish this task, the following device and accessories should work in unison to achieve the desired goal.

FIGS. 1A, 1B, 1C, 1D, 1E, and 1F all represent different schematic views that are representative of the device(s) and several subcomponents of the "Temperature Gate" or "Tempgate".

FIG. 1A is an isometric view (100A) of the "Tempgate" device (110) without any top covering portion that is formed by two panels (left and right side panels) and a connecting top portion housing (130). Here (120) is the front left edge portion of a left side panel which extends to the left side panel back edge end (122). Likewise, the front right edge portion of the right side panel (121) extends toward the back right edge of the right panel portion (123). For FIG. 1A, a person (105) (could be an animal or other object as well) is proceeding along a typical targeted pathway (180) with a set of targeted path locations (182, 184, and 186) where (182) is the entrance location of the initial capture of the 3-D volume field of view as the person (105) enters the intersection of the fields of view focal planes. In this case (150) and (151) are IR reference temperature calibrators where (150) is a right-side panel IR reference temperature calibrator located within the field of view of one of the thermal imaging cameras (140). Here (151) is a left side IR reference temperature calibrator located within the field of view of a second thermal imaging camera (141). In this case there are also positioned at the top of the connecting top portion housing of the "Tempgate" device (110) one or more communications antennae (138). In this case the dashed lines from the thermal imaging cameras (140,141) are representations of the fields of view of the thermal imaging cameras directed toward the person that is headed toward the "Tempgate" device along the targeted pathway (180).

FIG. 1B is a front view (100B) of the "Tempgate" device (110) with a top covering portion (132) that includes the same two panels (left and right side panels (115, 116)) and a connecting top portion housing (130). Here only the front left edge portion (120) and the front right edge portion of the right side panel (121) are shown. As above, (150) and (151) are IR reference temperature calibrators where (150) is a right-side panel IR reference temperature calibrator located within the field of view of thermal imaging camera (140). Here (151) is a left side IR reference temperature calibrator located within the field of view of thermal imaging camera (141). In this case there are also positioned at the top of the connecting top portion housing of the "Tempgate" device (110) one or more communications antennae (138). In this case the dashed lines from the thermal imaging cameras (140,141) are representations of the fields of view that indicate that the IR reference temperature calibrators (150, 151) are at the appropriate elevation and location to be positioned within the field of view of the thermal imaging cameras (140,141).

FIG. 1C is a side view (100C) of the "Tempgate" device (110) with a top covering portion (132) that also includes two panels (left and right side panels (115, 116 not shown)) and a connecting top portion housing (130). Here, as in FIG. 1A, the front right edge portion of the right side panel (121) extends toward the back right edge of the same right panel portion (123). In this case there are also positioned at the top of the connecting top portion housing of the "Tempgate" device (110) one or more communications antennae (138). As also in FIG. 1A, a person (could be an animal or other object as well) is proceeding along a typical targeted pathway (180) with a set of path locations (182, 184, and 186) where (182) is the entrance location of the initial capture of the 3-D volume field of view as the person enters the intersection of the fields of view focal planes. In this case, the dashed lines from the thermal imaging camera (141) which shows the vertical angle of the field of view (143) with an upper limit of the field of view (144) and lower limit of the field of view (145) that captures a portion of the image of the person that is heading along the targeted pathway (180).

FIG. 1D is another isometric view (100D) of the "Tempgate" device (110). As shown in FIG. 1A, here (120) is the front left edge portion of a left side panel which extends to the same left side panel back edge end (122). Again, the front right edge portion of the right side panel (121) extends toward the back right edge of the right panel portion (123). As before there are also positioned at the top of the connecting top portion housing (130) of the "Tempgate" device (110) one or more communications antennae (138). In this case, the dashed lines from the thermal imaging cameras (140,141) are representations of the fields of view directed toward the person that is headed toward the "Tempgate"

device along the targeted pathway (180). Here, represented by solid lines with arrows at each end are shown the vertical field of view angle (146) from camera (140) and the horizontal field of view angle (147) from camera (140) on the right side of the device. Likewise, the solid lines with arrows at each end indicate the vertical field of view angle (148) from camera (141) and the horizontal field of view angle (149) from camera (141) on the left side of the device.

FIG. 1E is a top view (100E) of the "Tempgate" device (110) where again a person (105 from FIG. 1A) (could be an animal or other object as well) is proceeding along a typical targeted pathway (180) with a set of path locations (182, 184, and 186) where (182) is the entrance location of the initial capture of the 3-D volume field of view as the person (105 from FIG. 1A) enters the intersection of the fields of view focal planes. Here the starting location (160) is where the intersection of the focal planes exists and (166) is the ending location of the intersection of the fields of view focal planes. In this instance, (184) is the location along the targeted pathway of the person (105 as in FIG. 1A) that is the last position of capture of the 3-D field of view by the thermal imaging cameras (140) and (141). In addition, (186) is an exit location along the targeted pathway of the person (105 see FIG. 1A) where the 3-D field of view is no longer captured by the thermal imaging cameras (140, 141). Here represented by solid line with arrows at each end indicates an angle that is the horizontal field of view angle (147) from camera (140) on the left top side of the device. Likewise, the solid line with arrows at each end indicates the horizontal field of view angle (149) from camera (141) on the right top side of the device.

As the person (105 from FIG. 1A) traverses the targeted pathway starting at (182) and ending at (184), the person is simultaneously and instantaneously in an optimal view of the thermal imaging cameras (140, 141). This is the desired position (between 182 and 184) for measuring the person's skin temperature—specifically measured and core (and possibly the brain) temperature in an instant and where the imaging from the thermal imaging cameras intersect.

More specifically, from positions (160 to 166) there is an intersection of the fields of view using the thermal imaging cameras (140 and 141) which for the purposes of this working example are digital infrared cameras as well as possibly charge coupled cameras (CCD).

In order to fully describe the features of these IR cameras, the following explanation is provided as follows;

In this case the starting location (160) is where the intersection of the focal planes exists and (166) is the ending location of the intersection of the fields of view focal planes. In this instance, (184) is the location along the targeted pathway of the person (105 see FIG. 1A) that is the last position of capture of the 3-D field of view by the thermal imaging cameras (140) and (141). Here, (186) is an exit location along the targeted pathway of the person (105 see FIG. 1A) where the 3-D field of view is no longer captured by the thermal imaging cameras (140, 141). As the person (105—FIG. 1A) traverses the targeted pathway starting at (182) and ending at (184), the person is simultaneously and instantaneously in an optimal view of the thermal imaging cameras (140, 141). This is the desired position (between 182 and 184) for measuring the person's skin temperature—specifically measured and core (and possibly the brain) temperature in an instant and where the imaging from the thermal imaging cameras intersect.

For FIG. 1F, a frontal view (100F) of the "Tempgate" device (110), the initial camera placements of thermal imaging camera (140) is the upper left camera, and (141) is the upper right camera, as have been detailed in the other drawings. In FIG. 1E, the intersection of the FOV (field of view) of the two thermal imaging cameras (140 and 141) is noted as (160) (shown in FIG. 1E but not FIG. 1F) entering the combined FOV, and (166), exiting the combined FOV. It is only within the combined FOV of the two (or more) cameras that it is possible to capture 3D and even 4D features and images.

It is also possible and valuable to provide the at least two cameras with overlapping perspectives, which allows for the ability to reduce the "clutter" of background in the individual camera images. The background goes to infinity and may be filled with movement of other objects (people) which can produce false measurements. Once there are at least two thermal imaging cameras with overlapping perspectives, it is much easier to uniquely and only process the portion of the image which is common to the two or more cameras.

As shown and detailed in FIG. 1F, additional cameras can provide added perspectives for the "Tempgate" device(s) (110). Cameras placed at locations (172) middle left camera, and (173) middle right camera, provide a larger range of height for measuring the people passing through the temperature gate. The lower perspective enhances the opportunity to measure the face temperature of a person passing through the "Tempgate" device (110) who is looking downward, such as reading a book, newspaper, or portable phone. This is very important especially if the person has a hat, head covering, or long hair which is obstructing a large part of the forehead. The lower perspective helps to measure people in wheelchairs, shorter individuals and small children.

Additional cameras placed at locations (174) lower left camera, and (175) lower right camera, are useful for providing a larger range of height for measuring people that are taller and passing through the Tempgate device(s). Specifically, this lower perspective may be angled upwards to provide possible needed enhancement of an obstructed forehead.

Of course, Tempgate can be used to measure other objects, living or not, with proper image recognition. The added perspectives will aid in the accuracy of image recognition.

The general issue of a clear view of the face is one of the most important issues for the "Tempgate" operation to reduce false-positive measurements and non-measurement alarms. Utilizing multiple perspectives even a single spot of unobstructed skin larger than a pixel, at the measured distance from the camera, can provide a useful and reliable measurement of temperature. From multiple perspectives, an accurate measurement of the distance from each of the at least two cameras is possible, which then allows an accurate calculation of pixel size at the known distance. With multiple perspectives, the same spot (area) can be measured by multiple cameras, and these measurements correlated and averaged, to provide a quality measurement of temperature even when most of the face is obstructed.

The issue of facial coverings obstructing temperature measurement is further complicated by those wearing glasses and masks. This issue is also impacting facial recognition equipment devices. Multiple camera perspectives provide more information for facial recognition.

Camera position (176) is an example of another useful camera position. As noted earlier, the vertical perspective of the camera to the face is important in order to obtain quality temperature measurements. The same problem occurs if a person is looking left or right while passing through the temperature gate. Placements to the left (140, 142, 174), and right (141, 173, 175) improve the opportunity to make a good quality temperature measurement regardless of facial perspective while passing through the gate. Camera position (176) provides further verification of a person moving through the "Tempgate".

All of these cameras at various positions (140,141 and subsequent cameras 172, 173, 174, 175, and 176) are based on making temperature measurements in one direction only. To provide bi-directional temperature measurements, a second set of cameras are required, for example cameras (177 and 178) located at the positions shown to measure the temperature of a person passing through the temperature gate in the opposite direction than indicated in FIGS. 1A-1E with the shown targeted pathways (180, 182, 184, 186). It is easily understood that the entire set of cameras (140, 141) and subsequent cameras (172-176) can be duplicated in the reverse direction (as for 177, 178) in order that "Tempgate" can function as a bi-directional device. In other words it is possible that a person could pass through "Tempgate" in an opposite direction than is normally intended and the temperature measurements can be performed equally to that of the person moving in the intended direction.

IR temperature reference calibrators (150) and (151) are placed in the field of view (FOV) of the thermal imaging cameras as described earlier, to provide known reference temperatures to insure proper camera temperature calibration. Additional temperature calibration points can likewise be placed in the FOV of the additional cameras. For FIG. 1F, the temperature calibration point of the IR temperature reference calibrator (150) is in the FOV of camera (140). Additional IR temperature reference calibrators (152-155) which impart further temperature calibration points are provided. Likewise IR reference temperature (151) is in the FOV of the thermal imaging camera (141).

Likewise IR reference temperature calibrator (152) is in the FOV of camera (172).

Likewise IR reference temperature calibrator (153) is in the FOV of camera (173).

Likewise IR reference temperature calibrator (154) is in the FOV of camera (174).

Likewise IR reference temperature calibrator (155) is in the FOV of camera (175).

The vertical field of view angle (146) from thermal imaging camera (140) may have an overlapping FOV with some of these calibration points. Again, it is easily understood that that the entire set of IR reference temperature calibrators (150 through 155) can be duplicated in the reverse direction in order that "Tempgate" function as a bi-directional device.

The cameras (140,141) include the ability to provide a pixelated image capture and correlated temperature by use of measuring and imaging capabilities that include defined optics that allow the image to be measured using infrared energy. The cameras must be capable of achieving a focused pixeled image capture by use of an infrared lens (that operates in the infrared energy spectrum). The granularity of the pixilation must be capable of resolution that can resolve small enough pixels to measure the smallest points on the object (person) that is being measured (for temperature and/or other biological parameters). These requirements exist so that one can resolve a series of measurements made in succession to find the appropriate measurement or set of measurements that accurately represent the temperature of the person being measured.

The thermal imaging cameras for the present disclosure are focused, multiple pixel, photon sensing devices. That is, for example, cameral (140, 141) includes sensors for IR which also could include the capabilities for visual, and UV emissions sensing devices with sensor detection pairs.

Figure 2A:
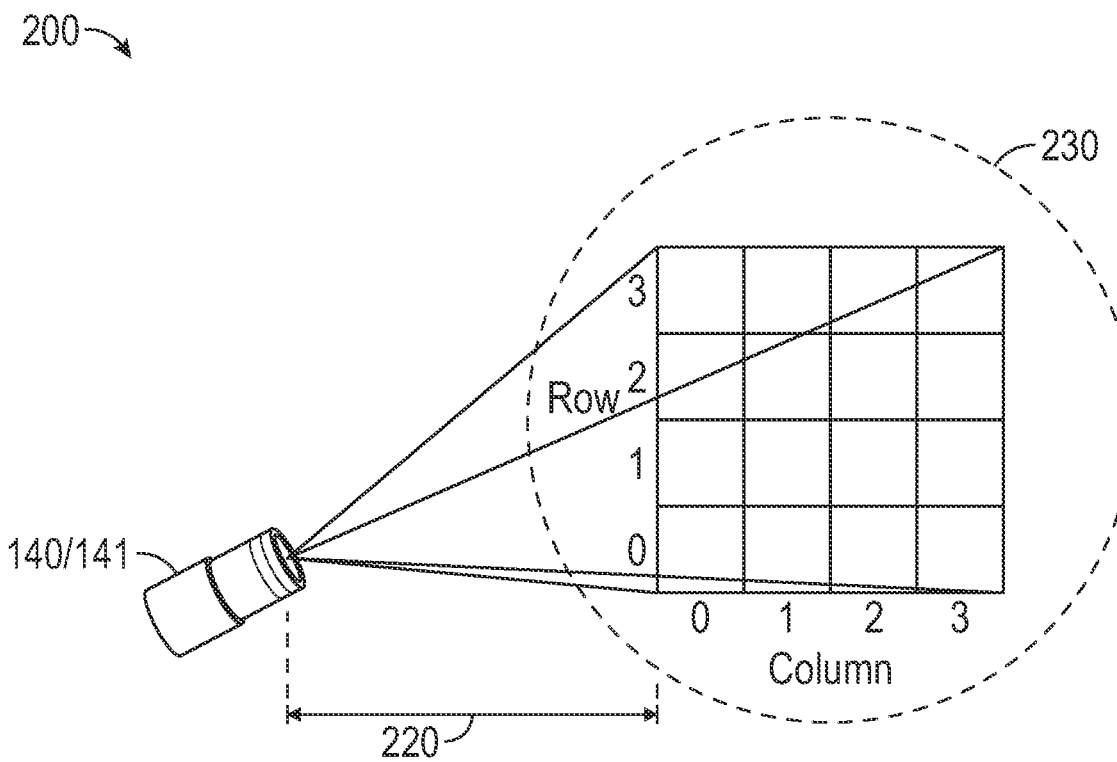
FIG. 2A is a schematic detailing the camera field of view and pixel representation for the thermal imaging camera.

FIG. 2A is a schematic (200) detailing the camera field of view and pixel representation for the thermal imaging cameras (140, 141) and has an internal array of pixels at the focal plane of a lens. The pixel array is focused at some distance (220) to an apparent Field Of View (FOV), (230).

For FIG. 2A (200), the thermal camera (140, 141) has an array of 4×4 pixels, that is four columns by four rows of pixels in a rectilinear arrangement. These are numbered from the lower left as row x, column y. Pixels are denoted by their position in this matrix. For example, the lower left pixel is (0,0) and the lower right pixel is (0,3).

Figure 2B:
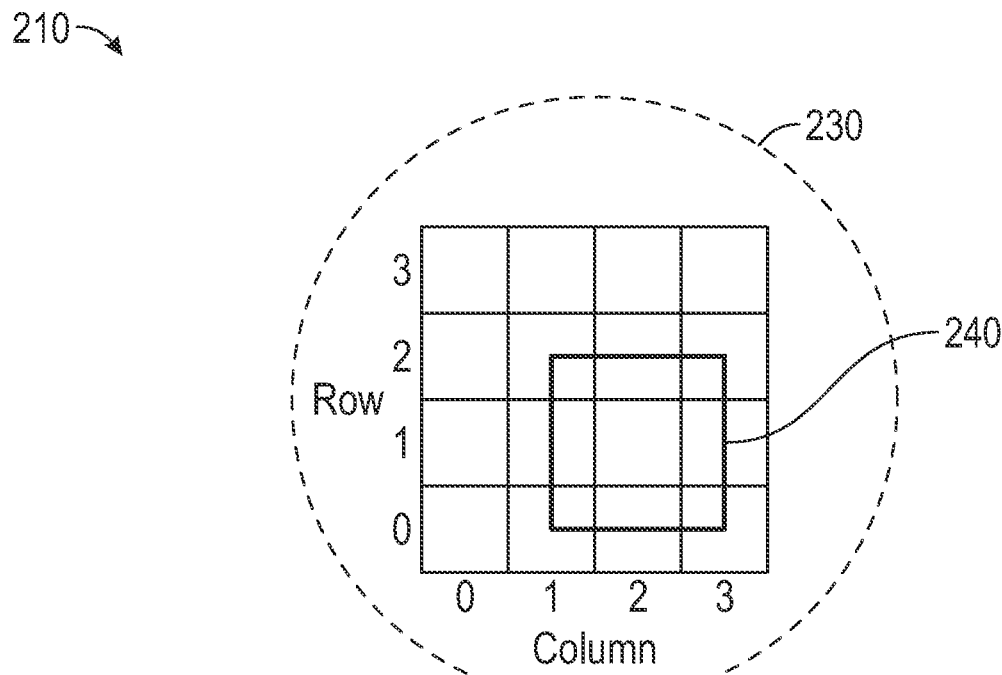
FIG. 2B provides a plan view of the FOV of the thermal imaging cameras.

FIG. 2B provides a plan view (210) of the apparent FOV (230) of the thermal imaging cameras. Here, within the apparent FOV (230) which is shown as a rectilinear arrangement there exists a minimum cross sectional area and in three dimensions (3-D) a minimum cross sectional volume (240) that has a minimum size, a specific shape, and requires a proper alignment of any temperature calibration device (including the IR temperature reference calibrators) being viewed by the pixels of the camera at a known and often predetermined distance as shown in FIG. 2A (220).

The temperature calibration device must be at least two times the apparent size of a pixel at the distance (220) of the calibration device from the camera (140,141). This minimum size is required so that the temperature calibration completely covers at least one pixel in a "worst-case" alignment scenario for the temperature calibration device and the associated pixels.

In this case, only the pixel of the thermal imaging camera (140, 141) along the apparent field of view FOV (130) at position row 1, column 2 (1,2) is focusing and measuring the temperature of the temperature calibration device. This is necessary to define the overall minimum required size of the temperature calibration device. The temperature calibration device implemented must meet at least this minimum. In addition, the calibrator should be directly facing the camera. The emissive coating may have some undesirable "off angle" properties so providing a dimensionally aligned calibrator is the best technique found to date. The calibrator surface must be larger than one pixel just in case the surfaces and images are not perfectly aligned. Normally, this is accomplished by making the calibrator(s) twice as large as a pixel or more. If the calibrator is "off angle" the effective view of the calibrator(s) surface(s) is reduced by the cosine of the angle, so that the calibrator needs to be even larger than two times the pixel size.

In order for the IR reference temperature to be read to achieve the best accuracy and performance the IR reference temperature must measured at a specific angle directed toward the front of the camera due to a set of thermodynamic/material properties that involve the composition of the emissive coating. If the emissive coating is measured off angle this often provides changes in the measured emissivity. The second purpose involves geometry.

For FIG. 3A (300), a cross sectional view (310) of a passive IR reference temperature calibrator with a cross section (310) is shown. The passive IR reference temperature calibrator (301) is comprised of a passive uniform temperature block (320), a known thermal coating (330), a thermal insulator block (340), a precision temperature reference measurement unit (350) that measures and reports the temperature of the passive uniform temperature block (320) via connection(s) (355). The thermal insulator (340) allows the passive uniform temperature block (320) to maintain a more uniform temperature. Here the passive uniform temperature block (320) is attached to the thermal insulator (340) which in turn insulates the uniform temperature block (320). The passive uniform temperature block (320) includes the thermal coating (330) with a known emissivity as alluded to above. The thermal insulator (340) is attached to a mounting substrate (315). A thermal coating (330) of known emissivity is bonded to or may be integral to the passive uniform temperature block (320). Photons (335) are emitted by the thermal coating (330) according to IR reference temperatures determined using black body standards.

For FIG. 3B (305), a frontal view (370) of one embodiment using passive IR reference temperature calibrators (301) located at the positions of IR temperature calibrators (150-155) (shown in FIG. 1F) and shown as a cross section in (310). The precision temperature reference measurement unit (350) is attached to the back of the passive uniform temperature block (320). The shape and size of the precision temperature reference measurement unit (350) with one or more connections (355) are defined and constrained by the precision temperature reference measurement unit and possess the thermal conductivity of the passive uniform temperature block (320). It is desirable that the dimensions of the height and width shown in the FIG. 3B frontal view (370) of the passive uniform temperature block (320) are a minimum of at least two times the effective dimension of a single pixel projected by the camera FOV as described above in FIG. 2A and FIG. 2B, and specifically referring to the rectilinear volume (240).

The frontal portion of the passive uniform temperature block (320) can be larger than the minimum required size. The passive uniform temperature block (320) can be other shapes than the minimum size requirement of a rectangular pixel as shown in FIG. 2B—specifically the rectilinear volume (240). For instance, the passive uniform temperature block (320) could be round and the emissivity coating, as previously stated, is often of non-uniform thickness.

Again it is important to note here that the preferred orientation (330) for the camera field of view (330) is parallel to the focal plane of the camera sensor. This solves two important criteria. One is the need for the emissivity (335) of the coating (330) to be more uniform when an off-angle from the frontal view occurs. The emissive coating does not always have consistent and uniform properties. The second criteria, is the need to provide an effective dimension off-angle increases by the tangent of the angle. This results in increasing the minimum dimensions for the passive uniform temperature block (320) and coating (330) to suit the amount of non-parallelism between the coating (330) and the camera (140,141) sensor.

FIG. 4A, is a schematic representation (400) for a heated IR reference temperature calibrator (415) shown with a cross-sectional view (410). The calibrator device (415) consists of a heated uniform temperature block (420), a coating (330) of known emissivity, a thermal insulator block (340), and a precision temperature reference measurement unit (350) with a connection (355) from the precision temperature reference measurement unit (350) to equipment which converts the temperature measurement to a useful signal. In addition, there is a mounting substrate (315) to which the IR reference temperature calibrator (415) is attached.

A known thermal coating (330) is bonded to or may be integral to the thermally conductive material of the heated uniform temperature block (420). Photons (335) are emitted by the emissivity coating (330) according to IR reference temperatures determined using black body standards.

A thermal insulator block (340) allows the heated uniform temperature block (420) to be a more uniform temperature. The heated uniform temperature block (420) is partially embedded in the thermal insulator block (440) which insulates the edges of heated uniform temperature block. (420).

The precision temperature reference measurement unit (350) can be any of the following but not limited to, resistance temperature devices, thermocouples, thermistors, fiber optic gratings, crystal oscillators, semiconductors, cavity oscillators, thermal ovens, capacitors, strain measurement devices, bolometers, and thermometers.

A connection (355) is made between an appropriate portion of the temperature measurement device to the supporting conversion of temperature to a form useable in the temperature gate device.

A heater (460) is attached to the heated uniform temperature block (420).

The heater (460) can be selected from one or more and is not limited to; an electric heater, resistance heater, hydronic heater, infra-red heater, radiant heater, incandescent heater, semiconductor heater, Peltier heater, ultrasonic heater, chemical reaction heater, battery, resistor, induction heater, microwave heater, fluid circulating thermal modulator.

There is a second connection (465) between the heater (460) and the energy supply (not shown) in order to increase the temperature of the heated uniform temperature block (420).

Utilizing a thermal controller (not shown) to supply heating energy from the heater (460) through the second connection to the heater (465), the heated uniform temperature block (420) will increase in temperature, while the temperature is measured by one or more precision temperature reference measurement units (350). A connection (355) exists in order to report the temperature of the heated uniform temperature block (420) and allows for regulation of the amount of power required to keep the heated uniform temperature block (420) within an accurate, precise, known temperature.

Utilizing specific heaters from a list of fluid circulating thermal modulators, it is possible to both heat and cool the heated uniform temperature block (420) using the fluid circulating thermal modulator to supply heated or cooled fluid.

FIG. 4B provides the frontal view (470) of the heated IR reference temperature calibrator sensor (415). For this view, the heated uniform temperature block (420) has a known thermal coating (330) as described earlier.

The precision temperature reference measurement unit (350) is attached to the back of the heated uniform temperature block (420). The shape and size of the precision temperature reference measurement unit (350) with one or more connections (355) are defined and constrained by the precision temperature reference measurement unit (350) and possess the thermal conductivity of the heated uniform temperature block (420). It is desirable that the dimensions of the height and width shown in the FIG. 4B frontal view (405) of the heated uniform temperature block (420) are a minimum of at least two times the effective dimension of a single pixel projected by the camera FOV as described above in FIG. 2A and FIG. 2B, and specifically referring to the rectilinear volume (240).

In another embodiment, the heated IR reference temperature calibrator sensor (415) can be located at the positions of IR temperature calibrators (150-155) (shown in FIG. 1F).

FIG. 5A, is a schematic representation (500) for a Peltier cell temperature calibration device (515) shown with a cross-sectional view (510). The Peltier cell temperature calibration device (515) consists of a Peltier cell uniform temperature block (520), a coating (330) of known emissivity, a thermal insulator block (340), and a precision temperature reference measurement unit (350) with a connection (355) from the precision temperature reference measurement unit (350) to equipment which converts the temperature measurement to a useful signal. In addition, there is a mounting substrate (315) to which the Peltier cell temperature calibration device (515) is attached.

A thermal coating (330) is bonded to or may be integral to Peltier cell uniform temperature block (520). Photons (335) are emitted by the thermal coating (330) according to IR reference temperatures determined using black body standards. The Peltier cell uniform temperature block (520) with thermally conductive material provides a uniform temperature.

A thermal insulator block (340) allows the Peltier cell uniform temperature block (520) to maintain a more uniform temperature. The Peltier cell uniform temperature block (520) is partially embedded in the thermal insulator block (340) which insulates the edges of Peltier cell uniform temperature block (520) and the Peltier cell (560) itself.

The precision temperature reference measurement unit (350) can be any of the following but not limited to, resistance temperature devices, thermocouples, thermistors, fiber optic gratings, crystal oscillators, semiconductors, cavity oscillators, thermal ovens, capacitors, strain measurement devices, bolometers, and thermometers.

A Peltier cell (560) is attached to the Peltier cell uniform temperature block (520).

There is a second connection (565) between the Peltier cell (560) and the energy supply (not shown) in order to increase the temperature of the Peltier cell uniform temperature block (520).

In addition, a connection (355) is provided so that the appropriate connection of the temperature measurement device to the supporting conversation of temperature to a signal that is readable exists within the "Tempgate" devices.

As shown and described previously, the Peltier cell (560) is attached to the Peltier cell uniform temperature block (520). The Peltier cell (560) is an electrical semiconducting device that uses electric current to transfer thermal energy from one side of the cell to the other side of the cell, with the heat flow direction and thermal flux controlled by the amount of electrical current that is provided to the cell. Peltier cells are understood and well known by those familiar with their use.

A second connection (465) of the Peltier cell (560) to supply current to operate the Peltier cell (560) is shown. In addition, there is an optional thermal heat sink (568) that is attached to Peltier cell (560) to transfer thermal heat flux to and from the environment in the case that the mounting substrate (315) is not sufficient to support the required transfer of thermal heat flux to and from the Peltier cell (560).

Utilizing a Peltier cell thermal controller (not shown) to supply current to the Peltier cell (560) through a second connection (565), it is possible to both heat and cool the Peltier cell uniform temperature block (520). In order to achieve this result, the temperature of the Peltier cell temperature block (520) must be accurately measured. The temperature of the Peltier cell uniform temperature block (520) is measured by the precision temperature reference measurement unit (350), through a connection (355) in order to report the temperature of the Peltier cell uniform temperature block (520) and regulate the amount and direction of electric current required to keep the Peltier cell uniform temperature block (520) within an accurate, precise and known temperature. There is a thermally insulated well (525) which is formed by a cavity that keeps the heat flux of the Peltier cell (560) flowing directly into the Peltier cell uniform temperature block (520) and also ensures that the heat flux does not flow toward the precision temperature reference measurement unit (350).

FIG. 5B (505) provides the frontal view (570) of a Peltier cell temperature calibration device (505). In this arrangement, a Peltier cell uniform temperature block (520) which has a thermal coating (330) of known emissivity as described earlier also exists.

It is desirable that the dimensions height and width shown in the frontal view (570) are at least two times the effective dimension of a single pixel projected by the camera FOV as described in FIGS. 3A and 3B.

The precision temperature reference measurement unit (350) is attached to the back of the Peltier cell uniform temperature block (320). The shape and size of the precision temperature reference measurement unit (350) with one or more connections (355, 465) are defined and constrained by the precision temperature reference measurement unit (350) and possess the thermal conductivity of the Peltier cell uniform temperature block (520). It is desirable that the dimensions of the height and width shown in the FIG. 5B frontal view (505) of the Peltier cell uniform temperature block (520) are a minimum of at least two times the effective dimension of a single pixel projected by the camera FOV as described above in FIG. 2A and FIG. 2B, and specifically referring to the rectilinear volume (240).

In another embodiment, the Peltier cell temperature calibration device (515) can be located at the positions of IR temperature calibrators (150-155) (shown in FIG. 1F).

Temperature can be modulated and adjusted by the "Tempgate" itself to provide full linearization and calibration of the thermal imaging cameras on a continuous basis thru the entire temperature range of interest. By using the Peltier Cell it is possible to heat and cool and slowly change the temperature of the Peltier cell across a broad range of temperature and calibrate the thermal imaging cameras at multiple points in very small denominations of temperature changes along a temperature range (e.g. 0.1 degree over a 10 degree range). This provides a self-calibrating tool and method capability which greatly enhances the precision and accuracy of the measured and core temperature determined by the "Tempgate" devices of the present disclosure.

The Peltier cell temperature calibration device (515) provides a precisely known temperature with a precisely known emissivity in the Field of View (FOV) of the long wavelength IR (LWIR) cameras. This location in the long wavelength (LWIR) cameras is aligned with specific pixels. These pixels measure only the precisely known temperature when an unobstructed view of the desired portion of the individual being measured is available. The "Tempgate" can therefore readjust the entire LWIR cameras using a standard linear approximation to calibrate the entire LWIR cameras continuously to match the Peltier cell temperature calibration device.

Figure 6:
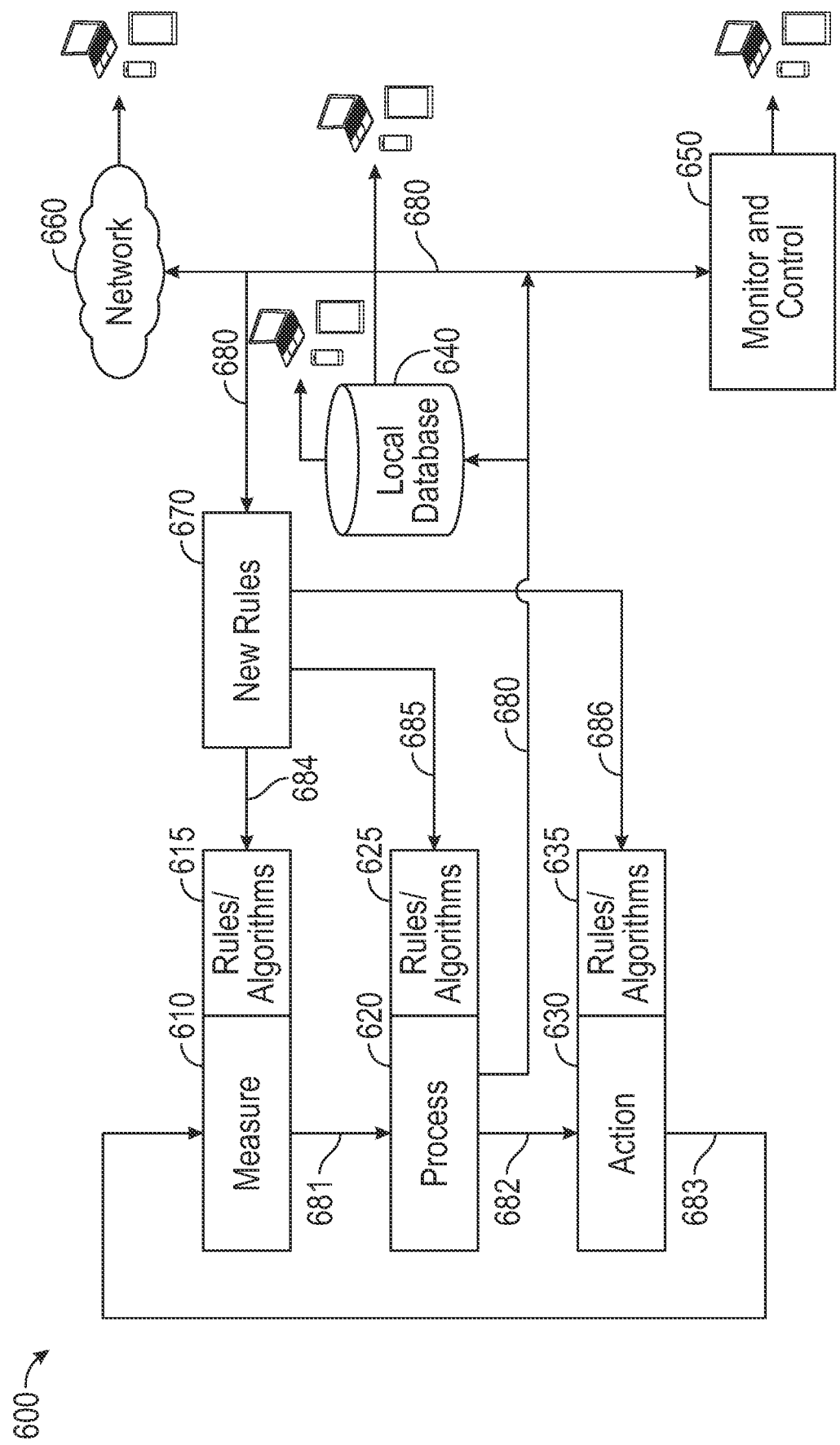
FIG. 6 depicts a process flow block diagram that includes a monitoring and control system for the temperature measuring device(s).

FIG. 6 is a process flow block diagram (600) that includes a monitoring and control system for the temperature measuring device(s) (110), "Tempgate", of the present disclosure.

Beginning with the first block, which is the temperature measurement portion (610), the two or more thermal imaging cameras detect every possible temperature associated with at least one object (person or animal) that is passing into and out of the field of view of the two or more thermal imaging cameras. In so doing, the temperatures measured often are those not associated with the targeted persons(s) due to the fact that these temperatures are measured temperatures from one or more pixels from these two or more thermal imaging cameras. Based on our initial experience, only 5-10% of the captured temperature data is that of the one or more persons in the targeted pathway (see FIGS. 1A-1F). In addition, the temperature data can include calibrators, clothing, eyeglasses, headwear, etc. in or other words everything in the targeted pathway that is not the targeted pathway target itself. To overcome this issue it is necessary to provide first set of rules and specific algorithms (615) that detect the differences between the target of the targeted pathway and anything that is not the target. Some of these rules utilize the fact that the two thermal imaging cameras are providing through their respective FOV, intersecting 3-D images of the target. If the rules are properly followed this allows for increased precision and accuracy of the temperatures of the target.

These digital images are processed using first set of rules and specific algorithms (615) for the following steps, which are digital image measurement steps that include:
 (a) Data detection which is a rule-based algorithm for locating the measurement target locations and target measured temperatures; and
 (b) Data organization which is a rule-based algorithm for tracking the target in 3D space over time to produce a 4D targeted path for each target.

The temperature measurement data is provided as signals on a communication path (681) to the process section (620) that processes the temperature measurement data measurements (from 610) and implements an additional set of rules and specific algorithms (625) that must be employed to extract the proper set of data using the following digital image processing steps:

First the temperature measurement data is extracted using the second set of rules based algorithm (625) that determines the measured temperature of each target and the exact location of where the temperature measurement was achieved. The additional second set of rules (625) provides an algorithm for conversion of the target measured temperature to a core temperature of the at least one person (object/animal) passing through the targeted pathway of the "Tempgate".

This process portion (block) (620) of the process system (600) provides an output (from the "Tempgate") which includes a list of core temperature measurement(s) at the corresponding location(s).

The temperature measurement portion (610) and the process data portion (620) with the corresponding set of rules (615 and 625) are made available to the "Tempgate" device(s)" using an internal data channel (680). This internal data channel (680) communicates data between all of the internal processes and devices used to manufacture and implement the "Tempgate" devices described herein.

Then, the temperature measurements are sent as data signals along a communication path (682) to the action portion/block (630) that utilizes another algorithm to determine specific actions necessary for proper functionality of the "Tempgate" devices. This includes providing the core temperatures and corresponding locations from the process data portion (620) according to a third set of specific rules and corresponding algorithms (635) with includes actions as follows;
 (a) An annunciation capability which is based upon another rule based algorithm that is employed to provide the core temperature measurement via: visual indicators, visual displays, bells, buzzers, alarms, audio speakers, audio content files, speech synthesizers, etc.
 (b) an alarm capability that provides additional rule based algorithms to produce an alarm via visual indicators, visual displays, bells, buzzers, alarms, audio speakers, audio content files, speech synthesizers, etc. and;
 (c) an impedance capability which utilizes an algorithm that impedes a targeted pathway through the "Tempgate" device utilizing one or more of several devices including locks, doors, gates, turnstiles, man traps, etc.

Once the completion of the Action portion (630) is accomplished, the data with appropriate decisions are communicated via communication path (683) back to the temperature measurement portion (610) and requests additional measurements that provide more data that eventually is transmitted via communication paths (681) and (682). This completes a continuously repeating cycle of temperature measurement (610), processing portion (620) and action portion (630).

The local database (640) continuously reads and writes data that provides data on demand to any portion of the process flow system (600) of the "Tempgate" device as needed. The data provided to, residing in, or extracted from the local database (640) is transmitted through the internal data channel (680).

The local Database (640) also records the process portion (620) activity which includes a record of the "Tempgate" device'(s) data acquisition.

The monitor and control portion (650) provides an ability to monitor and control the "Tempgate" device locally again utilizing data transmission that occurs along the internal data channel (680). Locally monitoring and controlling is performed either where the "Tempgate" devices are located or within close proximity to them.

If it is useful or necessary to remotely control and monitor the "Tempgate" devices, one or more Networks (660) can be implemented and these Networks (660) can be also be accessed and utilized via the internal data channel (680). These networks (660) may be connected via signals that are in the form of energy such as radio signals, light signals, electromagnetic signals, acoustic signals and transmitted via wires, optical fibers, etc. These networks may also utilize various forms of communications security.

In addition, a New Rules portion represented as block (670) provides an ability to generate and update the first second and third set rules (615, 625, and 635) with corresponding algorithms which can be implemented for data that is eventually transmitted by the internal data channel (680).

More specifically:
Rules block (615) is updated via signal pathway (684).
Rules block (625) is updated via signal pathway (685).
Rules block (635) is updated via signal pathway (686).

The thermal sensing devices which include the "Tempgate" portion provide a multi-sensor entrance and exit temperature monitoring of individuals and these devices also include one or more control units.

The "Tempgate" portion can act as a stand-alone device which contains enough computational capabilities, memory, inputs and outputs to be fully autonomous. Fully autonomous in this case means that the "Tempgate" devices stand alone and do not require ancillary equipment to operate.

The thermal imaging cameras include sensors that are broad wavelength multiple pixel focused array sensors. As previously mentioned, due to cost limitations, a visual spectrum camera is employed that is comparably very inexpensive and still provides high resolution (1080×768 color pixels). In addition, it is important to note that as the present disclosure and associated invention is to be initially built and deployed in the United States, currently there are no export restrictions on this camera technology. As alluded to above, the LWIR (long wave IR cameras) are very expensive to provide an identical resolution. Therefore, we have arranged for using the lowest useful resolution for the actual thermal imaging sensing devices including the temperature gate for the present disclosure. This resolution should be 80×64 pixels. Pixel size, resolution, FOV (field of view), apparent pixel size at various distances from the LWIR sensor array, thermal integration across the entire area of a thermal pixel, maximum useful pixel size for measuring human temperatures are all important and part of the present disclosure. It is also important to note that the potential use of the visual camera as an initial target locator along the targeted pathway for the person entering and exiting the thermal sensing devices can assist with locating the human face as it passes through the gate portion. Therefore, we are utilizing the visual location to improve the ability to sense, acquire and send the thermal measurement data to the necessary data processing portion of the devices. Further, the visual locating cameras and imaging is capable of providing facial recognition features. This visual location and imaging reduce the number of "false positives" which will be sensed by the thermal imaging cameras including hotter items such as coffee cups, reflections, and clothing hot spots.

In order to achieve these measurements with a relatively low degree of resolution with both cost and accurate/precise efficiencies it must be possible to distinguish skin temperature from the human body and that of clothing or other protective coverings a person may be wearing. The visual location cameras/thermal sensing cameras and equipment must locate skin areas with the highest temperature within the exposed skin of the individual including the face, forehead, eye sockets, cheeks and the neck. As discussed in detail above, brain temperature—specifically brain tunnel temperature is the most desirable temperature measurement that can be achieved. Unfortunately, it is not always possible to make this measurement for every individual passing through the target pathway in 500 ms or less and it becomes increasingly difficult to achieve these measurements when more than 1 person is passing through in an instant of time. A rule of thumb to use is to have the pixels to be smaller than a ½×½ inch (½×½) sized pixel when it is resolved through the field of view of the camera. Anything smaller than this sized pixel will increase resolution and thereby measurement reading accuracy and precision. The key is that this measurement has to be performed on human measured and core otherwise the measurement has little or no use. Distinguishing the differences between coverings and the measured and core itself must be immediate and accurate.

As both visual and thermal digital imaging has become more and more commonplace the cost of these camera-like devices to achieve high resolution has also dropped significantly. As of 2020, purchase of imagers that have pixel resolution of 768×1080 (for example used now for televisions) e.g. 768 pixels in one direction (horizontal) and 1080 (vertical) is possible for most large screen televisions and can be projected in three dimensions (3-D). This resolution capability, for example, is 10 million ($10 \times 10^6$) times more than the 64×80 resolution cameras which are the low resolution capabilities required for the thermal imaging devices of the present disclosure. This elimination in the need for high resolution thermal imaging equipment greatly reduces the cost of the devices and allows for a much higher degree of deployment. In other words, several of these devices can be employed in several locations (as opposed to a single device in a single location) due to an order of magnitude difference in costs of both the equipment and deployment of the devices. In addition to lower resolution, data capture rate of the targeted image is lower and therefore manipulation of the data with high speed computerized microprocessors is necessary to achieve the desired 500 ms or less results.

As previously stated, data capture rate of the IR sensor is extremely important as the person walking/running through the gate must be scanned and analyzed within this timeframe. Basically, nine (9) frames of data capture per second is all that is allowed by ITAR for the international market. Here ITAR refers to the International Traffic in Arms Regulations and is a United States regulatory regime to restrict and control the export of defense and military related technologies to safeguard U.S. national security and further U.S. foreign policy objectives.

This rate of data capture is enough to provide a reliable measurement of the temperature of a person based upon several trials achieved during development of these devices. It is desirable to capture at least 4 frames of data during that transit time of 400 ms through the field of view from the thermal imaging device (camera) in order to measure the temperature at least 4 times as the person walks along the path. In other words, at 9 frames per second per camera, with two cameras there are 18 frames per second, so in 400 milliseconds there are 7.2 frames of data available. Processing these at least 7 frames of data to locate and cross correlate the moving target (head and neck of a person) and measuring the same temperature four (4) separate times, there is a reasonable certainty that the measurement is both reproducible and precise.

Specifically, 9 frames per second×2×0.400 seconds is 7.2 frames of data capture within 400 ms using this device. The entire data matrix per frame is 64×80 pixels—a total of 5120 pixels and each one of the pixels is 16 bits of data=81,920 bits per frame. Processing 7.2 frames per second is 589,824 bits per second of temperature image data processed to measure one temperature.

In theory, it is possible to acquire and resolve 3.6 frames of thermal/visual data per camera, as an individual or groups of individuals travel between locations (160) and (166) where we have convergence of the field of the view of the 2 cameras (fully imaged with both cameras). The walking targeted path exists along a section that enters or exits the gate/tunnel in a location that provides the worst possible scenario for acquiring data from the two (2) cameras to compensate for individuals not traveling though the center of the device along the best absolute pathway.

To clarify, the for instance the path of travel of the individual was not directly down the center—if the person moves over to the left or over to the right of center, that person would no longer exist in the optimal field of view of the camera (141) or in the optimal field of view for the other cameral (140) or the person would be in each field of view for a longer or shorter period of time depending upon their relative location to the other camera. Hence, with the two cameras is much more likely to have the opportunity to get more thermal imaging data capture from each of the cameras. As the individual approaches the vector from the left side entrance to the gate there is more field of view of camera (141). The person can still be a considerable distance away from the gate, however each camera is still capable of providing the data. It is important to note and understand that the further away from either camera, the larger the pixel is that exists for that image. The size of the pixel changes as the projected size of the pixel is related to the size and distance where the object exists.

More specifically, as the person is for example 10 feet away from the gate, the angle of the field of view is quite wide and the camera field of view is relatively large regardless of the amount or speed with which you acquire the thermal data. As the person approaches the gate, the closer the person gets the narrower field of view becomes. For a person whose height is 6 feet, it is possible to capture the person's full height at some location approaching the gate or within the gate itself so that one or both cameras are capturing all 64 pixels in one direction. In this case, for a person with a 6 foot height, divided into 64 little pixel, each pixel is $\frac{1}{64}^{th}$ of 6 feet. This translates into approximately 1 square inch of the body in the horizontal and the vertical direction when the person is 10 feet away. In this case each pixel covers one square of that person's body and everything else within the field of view of the camera(s). This, however, is not adequate to measure brain tunnel temperature or forehead temperature if the person is, for example wearing glasses, a scarf, a hat, etc. in that when the person is relatively far away from the gate it is impossible to measure one square inch of skin. Therefore it is necessary that the pixel integrate all of the data acquired of everything that is within the boundaries of the pixel and correlate this with all the temperatures acquired by the IR sensing portion of the camera as the camera will not only be capturing the data emitted from the measured and core temperature of that person.

As the person travels along the target path toward the gate, the camera and associated pixels now capture ½×½" squares instead of 1"×1" squares so that more and more of the pixels may not capture exposed skin but instead covered portions of the person's body. In this case, it may be possible to capture on a small portion of useful (skin exposed and skin emitting) pixels from the images captures while the cameras are in operation. With low resolution devices this is not a simple issue to solve.

As the person gets closer and closer to the gate entrance, e.g. 2.5 feet from the gate, reaching image intersection location (160), now the resolution and resulting pixel size is reliably smaller than ½" and at that distance it is necessary to get multiple measurements of only skin. So the problem remains, how is it possible to produce enough "large" pixels to actually measure the surface (measured and core and preferably brain) temperature of the body. It is necessary to acquire and resolve enough pixels to get at least ½" inch pixel size to capture measured and core temperature only, but this is not always possible when the person is moving quickly, is fully clothed, and it is necessary to capture the data in 500 ms or less.

Therefore it is understood that the distance field of view of the camera and the number of pixels—all based on the resolution of at least 64×64 (64×80 has recently been implemented) and the optics that are focusing the 64×80 resolution responsible for acquiring the image of the person to get an accurate and precise temperature of their measured and core temperatures which must be coordinated during the dynamic event of the person walking and not stopping.

What we found already is that for people looking down or to the left or to the right it is impossible to get an accurate reading of the measured and core temperature. If the person is not facing relatively square with respect to the camera's field of view/vision, the camera the temperature reading can vary greatly. This is due to changes in emissivity and the thermal area/volume being captured. Using two cameras, this problem is mostly resolved as the mounting of the two cameras (regardless of the poor resolution) in the proper position(s) immediately scans and captures more measured and core and more "thermal space" of the person's skin. This geometric spacing and data capture within 500 ms of each individual object/person/animal is critical to the inventive nature of this disclosure.

The two thermal imaging cameras preferably are mounted with one on the left and one on the right side of the front portion(s) of the gate. Other arrangements are possible including mounting one camera above and one below each other on the same side of the targeted pathway. In addition it is possible to have one camera above a location one on side of the targeted pathway and the other camera below this location on the opposite side of the targeted pathway.

In order to capture more measured and core temperature and ensure enough data is acquired within 500 ms or less for a dynamic temperature capture. It is required that there are an adequate number of facial views and as the speed of the persons entering and leaving the gate increases, more and more cameras may be required to achieve the desired result(s).

Together with the thermal imaging cameras in order to achieve the proper temperature it is also possible to provide on the same gate a set of at least two (2) calibrators which provide known reference temperatures according to IR reference temperature standards. The calibrators are known IR reference temperature devices that provide a reference temperature capability to improve the factory calibration (of the thermal imaging cameras) in the specific temperature measurement of interest. In other words, the calibrators provide a specific reference data point to make an absolute comparison for general thermal imaging camera temperature calibration.

The camera temperature measurement can utilize linear interpolation that provides the ability to accurately detect and quantify temperatures which are close to a known reference point. This changes our ability to make a two point calibration to at least a three point calibration. This third calibration point by linear interpolation temperature determination provides temperature measurements above and below the known calibrator temperature known as the "OFFSET" for the camera measurement of the thermal flux. The use of these calibrators thereby allows for more accurate and precise temperature readings during the scanning and data acquisition that occurs within the three dimensional volume where one or more person's data is captured.

By scanning and measuring the body for the skin temperature it is necessary to acquire the actual temperature with a thermal imaging camera which is measured with a contact sensor such as an oral thermometer at a certain reference temperature. This is only possible by correlating the temperatures and emissivity of the two bodies (human and black body) in order to ascertain the actual measured and core temperature of one or more person's body temperature in question. Ideally the correlation would be with a IR reference temperature with 100% emissivity (which is not available as a perfect IR reference temperature does not exist) but one that reaches a high emissivity value along with a compensation algorithm is common.

In this manner the measured temperature is energy is emitted or absorbed at the surface of the IR reference temperature and the camera is measuring the IR (and color) temperature of the average energy that hits each pixel. If 100% emissivity is coming from anybody (person or black body) then the temperature reading for that body is perfectly the same or identical. If, however as is always the case, they are not identical and if for example, the emissivity is 50% then the proper temperature measurement is achieved with a calibration curve. In addition to the geometric arrangement of the thermal sensing equipment/devices/cameras it is possible to adjust the temperature of the commercial black bodies with heaters that adjust to 35 C or higher. These black bodies do not function well in sunlight and therefore the use of a device which can heat and cool the IR reference temperature (such as a Peltier cell could provide the necessary instantaneous calibration needed to acquire precise and accurate temperature readings within the 500 ms requirement.

What is claimed is:

1. One or more temperature measuring devices comprising;
    at least two thermal imaging cameras capable of detection and provision of an exact location of at least one created dynamic image scanned by and triangulated with said at least two thermal imaging cameras, wherein said at least two thermal imaging cameras include a lens, an optical system, and a photodetector, one or more computerized micro-processors, and a gate that provides a constrained targeted pathway through which at least one person must travel so that dynamic thermal data of said at least one person is captured as said at least one person is moving through said gate, wherein said thermal imaging cameras are geometrically arranged in positions such that said thermal imaging cameras field of view on at least one of two possible locations that exist on or within said gate wherein said at least one person is scanned and provides targeted dynamic thermal data that is converted into one or more temperature readings and wherein said temperature measuring devices measure and transmit said temperature readings from one or more photodetectors existing within said thermal imaging cameras that sense thermal radiation naturally emitted by people passing through and defined by both said constrained targeted pathway detected by said thermal imaging cameras such that said at least two thermal imaging cameras lenses are focused on discrete points of a specific area defined by a focal view provided by said at least two thermal imaging cameras that combined provide a focused three dimensional volume along said constrained targeted pathway through which said at least one person passes through so that intersecting dynamic images are captured by said at least two thermal imaging cameras of said at least one person's at least one digital data image within said focused three dimensional volume that is converted to at least one digital data image by one or more computerized microprocessors that provides rapid detection, organization, extraction, and conversion of said digital data image(s) to both measured and core temperature values wherein said core temperature values are determined using a clinical grade oral thermometer measured on at least 20 humans and one or more exact dynamic locations of each person that passes through said gate, wherein said photodetector quantifies an energy flux in a measured long-infrared range of energy naturally emitted from said at least one person that moves through said targeted pathway as viewed by a set of optics provided with said thermal imaging cameras.

2. The temperature measuring devices of claim 1, wherein said measured and core temperature values and dynamic location measurements are extracted only after said at least one digital data image has been verified, correlated, and confirmed with a computational capability provided by said at least one computerized microprocessor to exist as a measured and core temperature taken from above a person's shoulders and within a temperature range of between 90 and 110 degrees Fahrenheit as provided by said computational capability.

3. The temperature measuring devices of claim 1, wherein said gate is a physical gate comprising at least two panels and a connecting top portion, wherein said connecting top portion is attached to a top portion of said at least two panels.

4. The temperature measuring devices of claim 1, wherein said gate is a virtual gate in that said gate constrains said constrained targeted pathway of said at least person as they are scanned by said temperature measuring devices.

5. The temperature measuring devices of claim 1, wherein said at least one created dynamic image is captured by three or more cameras that includes two or more thermal imaging cameras and at least one video imaging camera or at least one charge coupled (CCDP) camera.

6. The temperature measuring devices of claim 5, wherein said at least one video imaging camera provides an initial target locator along said constrained targeted pathway for said at least one person entering and exiting said temperature measuring devices to provide at least one dynamic location of at least one dynamic image of a bare portion of a human face as said at least one person passes through said gate.

7. The temperature measuring devices of claim 5, wherein said photodetector is a radiation sensor and/or a radiation detector or a long wavelength infrared (LWIR) sensor array.

8. The temperature measuring devices of claim 5, wherein said temperature measuring devices capture an instantaneous image of a measured temperature that is taken from an actual size of a person's body that is located above a shoulder region to at least a hairline region that is a resolved dynamic image of an actual size of a portion of a person's body is at least ½ inch by ½ inch.

9. The temperature measuring devices of claim 1, wherein said at least two thermal imaging cameras are low resolution cameras with said lens capable of location and resolution of dynamic images and provision of dynamic temperature readings with at least 64×64 pixels.

10. The temperature measuring devices of claim 8, wherein said at least two thermal imaging cameras provide an apparent pixel size at a distance wherein apparent pixels are smaller than or equal to ½ inch×½ inch, wherein said apparent pixel size is determined by pixel resolution of said two or more thermal imaging cameras, a field of view of said two or more thermal imaging camera lens and optics and a distance of said at least one person scanned by said two or more thermal imaging cameras.

11. The temperature measuring devices of claim 1, wherein an angle of view of said cameras is between 1 and 1000 mRad.

12. The temperature measuring devices of claim 1, wherein said at least two thermal imaging cameras have sensors capable of measuring a long wave infrared (LWIR) range of 8 to 15 µm.

13. The temperature measuring devices of claim 1, wherein said measured and core temperature values and dynamic location measurements are provided as an audio, visual, and/or audio-visual display.

14. The temperature measuring devices of claim 1, wherein said measured and core temperature values are provided as readouts in a form of data that is captured and subsequently selected from one or more of a group of data acquisition capabilities including; transmission, storage, analysis, retrieval and display via written, audible, visual and/or audible-visual techniques.

15. The temperature measuring devices of claim 1, wherein a display unit displays a thermal image of said focused three-dimensional volume as viewed by lens(es) of said cameras as said at least one person passes through said gate.

16. The temperature measuring devices of claim 15, wherein at least one display unit is included that is an alarm notification device that provides a go/no go signal and wherein a red light is one such signal and wherein said temperature measuring devices also include an alarm notification capability when a temperature reading is outside a specific temperature range and wherein said specified temperature range is between 90 and 110 degrees Fahrenheit.

17. The temperature measuring devices of claim 1 wherein said devices provide at least four measured and core temperature measurements within a set time interval.

18. The temperature measuring devices of claim 1, wherein dynamic images and associated temperature readings are rapid in that said temperature reading is performed within a time interval of no greater than 500 ms.

19. The temperature measuring devices of claim 1, wherein said at least two thermal imaging cameras have been pre-calibrated with one or more black bodies so that temperature readings are accurate, precise and reproducible with a range of between 2 and 4 degrees Fahrenheit.

20. The temperature measuring devices of claim 1, wherein an apparent field of view (FOV) exists as a cross-sectional area that defines a size, a shape, and distance scanned by and away from said at least two thermal imaging cameras and requires an alignment of one or more calibrators that are viewed by pixels of images from said one or more thermal imaging cameras that provides at least one reference temperature.

21. The temperature measuring devices of claim 20, wherein at least one known IR reference temperature calibrator provides a reference data point to make an absolute comparison for thermal imaging camera temperature calibration.

22. The at least one calibrator of claim 21, wherein said calibrator provides said thermal imaging cameras a temperature measurement capable of linear interpolation that provides an ability to accurately detect and quantify temperatures that are close to a known reference point and allows for an at least three point calibration and provides temperature measurements above and below a known calibrator temperature known as an OFFSET for camera measurement of thermal flux.

23. The at least one calibrator of claim 21, wherein said at least one calibrator includes utilization of a Peltier cell with multiple reference temperatures that provide reference ne temperature measurements and readings at discrete temperature intervals that provides an increased capability of precision temperature measurement.

24. One or more temperature measuring devices comprising two or more thermal imaging cameras that provide digital images processed using a first set of rules with digital image measurement steps that include:
   data detection which is a rule-based algorithm for locating both measurement target locations and target measured temperatures; and
   data organization that utilizes a rule-based algorithm for tracking a target in a 3D space over time to produce a 4D targeted path that tracks each target and;
   temperature measurement data is provided as signals on a communication path to a process section that processes temperature measurement data
   measures and implements a second set of rules that must be employed to extract a set of data that uses digital image processing steps:
   wherein first temperature measurement data is extracted using a second set of rules based algorithm that determines measured temperature of each target and an exact location that indicates where each temperature measurement was measured and wherein an additional second set of rules provides an algorithm for conversion of a target measured temperature to a core temperature wherein said core temperature is determined using a clinical grade oral thermometer on at least 20 humans of at least one person that passes through a targeted pathway of said temperature measuring devices.

25. The one or more temperature measuring devices of claim 24, wherein a process system provides an output which includes a list of core temperature measurement(s) at corresponding location(s).

26. The one or more temperature measuring devices of claim 25, wherein a temperature measurement portion and a process data portion with a corresponding set of rules are made available to said one or more temperature measuring devices using an internal data channel, wherein said internal data channel communicates data between all internal processes and devices used to manufacture and implement said one or more temperature measuring devices.

27. The one or more temperature measuring devices of claim 26, wherein said temperature measurements are sent as data signals along a communication path to an action portion of one or more temperature measurements that utilizes another algorithm to determine specific actions necessary to ensure functionality of said one or more temperature measurement devices.

28. The one or more temperature measuring devices of claim 27, wherein said temperature measurements provide core temperatures and corresponding locations from said process data portion according to a third set of rules that includes actions as follows;
   (i) an annunciation capability based upon another rule based algorithm that is employed to provide core temperature measurements selected from at least one of a group consisting of; visual indicators, visual displays, bells, buzzers, alarms, audio speakers, audio content files and speech synthesizers, and;
   (ii) an alarm capability that provides additional rule based algorithms to produce an alarm capability selected from at least one of a group consisting of via visual indicators, visual displays, bells, buzzers, alarms, audio speakers, audio content files, and speech synthesizers and;
   (iii) an impedance capability that utilizes an algorithm that impedes a targeted pathway through said one or more temperature measuring devices that utilizes at least one of a group of devices selected from; locks, doors, gates, turnstiles and man traps.

29. The one or more temperature measuring devices of claim 28, wherein upon completion of said action data that contains decisions are communicated via one or more communication paths back to a temperature measurement portion and requests additional measurements that provide more data eventually transmitted via said communication paths such that a continuously repeating cycle of temperature measurements is provided.

30. The one or more temperature measuring devices of claim 29, wherein a local database continuously reads and writes data that provides data on demand to any portion of a process that subsequently provides data to reside in, or be extracted from said local database wherein said data is transmitted through said internal data channel.

\* \* \* \* \*